(12) United States Patent
Malone

(10) Patent No.: US 11,219,194 B1
(45) Date of Patent: Jan. 11, 2022

(54) AQUAPONIC NUTRIENT GENERATION MODULE

(71) Applicant: Malone Industries, LLC, Louisville, CO (US)

(72) Inventor: Ronald F. Malone, Baton Rouge, LA (US)

(73) Assignee: Malone Industries, LLC, Louisville, CO (US)

( * ) Notice: Subject to any disclaimer, the term of this patent is extended or adjusted under 35 U.S.C. 154(b) by 24 days.

(21) Appl. No.: 16/871,880

(22) Filed: May 11, 2020

Related U.S. Application Data

(60) Provisional application No. 62/846,148, filed on May 10, 2019.

(51) Int. Cl.
| | |
|---|---|
| A01K 63/04 | (2006.01) |
| C02F 3/08 | (2006.01) |
| C02F 3/22 | (2006.01) |
| A01K 63/00 | (2017.01) |
| A01G 31/02 | (2006.01) |
| A01G 31/00 | (2018.01) |
| C02F 103/22 | (2006.01) |

(52) U.S. Cl.
CPC ............ *A01K 63/045* (2013.01); *A01G 31/02* (2013.01); *A01K 63/003* (2013.01); *C02F 3/087* (2013.01); *C02F 3/223* (2013.01); *A01G 2031/006* (2013.01); *C02F 2103/22* (2013.01); *C02F 2301/043* (2013.01); *C02F 2301/046* (2013.01)

(58) Field of Classification Search
CPC ..... A01K 63/045; A01K 63/003; C02F 3/223; C02F 3/087; C02F 2103/22; C02F 2301/043; C02F 2301/046; A01G 31/02; A01G 2031/006

USPC ........ 119/246, 227, 260, 261; 210/630, 615, 210/616, 617, 618, 150, 151, 167.22
See application file for complete search history.

(56) References Cited

U.S. PATENT DOCUMENTS

| | | | | |
|---|---|---|---|---|
| 4,415,450 A | * | 11/1983 | Wolverton | ............... C02F 3/28 210/602 |
| 5,232,586 A | | 8/1993 | Malone | |
| 5,288,400 A | * | 2/1994 | Phillips | ..................... C02F 3/06 210/151 |
| 5,445,740 A | | 8/1995 | Malone | |
| 5,965,016 A | * | 10/1999 | Suchowski | ............. C02F 3/085 210/167.22 |

(Continued)

OTHER PUBLICATIONS

Graber, Andreas, and Ranka Junge. "Aquaponic Systems: Nutrient recycling from fish wastewater by vegetable production." Desalination 246.1-3 (2009): 147-156.

(Continued)

*Primary Examiner* — Fred Prince
(74) *Attorney, Agent, or Firm* — Jones Walker LLP

(57) ABSTRACT

An aquaculture system including a fish tank, a floating media bioclarifier, and a mineralization tank. The mineralization tank includes a first influent inlet for receiving sludge having a first solids concentration from the bioclarifier, an effluent outlet for returning to the bioclarifier a fluid having a second solids concentration less than the first solids concentration, and a second influent inlet configured to receive influent from the fish tank which has bypassed the bioclarifier. A hydroponic system is configured to receive effluent from the bioclarifier.

31 Claims, 17 Drawing Sheets

(56) References Cited

U.S. PATENT DOCUMENTS

| | | | |
|---|---|---|---|
| 6,858,143 B2* | 2/2005 | Onali | A01K 63/04 |
| | | | 119/260 |
| 7,082,893 B2* | 8/2006 | Schreier | C02F 3/087 |
| | | | 119/259 |
| 9,227,863 B2 | 1/2016 | Malone | |
| 9,232,702 B1 | 1/2016 | Nelson et al. | |
| 9,827,512 B2 | 11/2017 | Malone | |
| 10,112,855 B2 | 10/2018 | Malone | |
| 10,238,997 B2 | 3/2019 | Malone | |
| 2007/0267346 A1* | 11/2007 | Sengupta | C02F 3/28 |
| | | | 210/610 |
| 2011/0068057 A1* | 3/2011 | Haley, III | C02F 3/006 |
| | | | 210/619 |
| 2015/0041376 A1* | 2/2015 | Fulford | C02F 3/206 |
| | | | 210/143 |
| 2017/0332567 A1* | 11/2017 | Gencer | A01H 4/001 |
| 2018/0133624 A1 | 5/2018 | Malone | |

OTHER PUBLICATIONS

Kloas, Werner, et al. "A new concept for aquaponic systems to improve sustainability, increase productivity, and reduce environmental impacts." Aquaculture Environment Interactions 7.2 (2015): 179-192.

Monsees, Hendrik, Werner Kloas, and Sven Wuertz. "Decoupled systems on trial: eliminating bottlenecks to improve aquaponic processes." PloS one 12.9 (2017): e0183056.

* cited by examiner

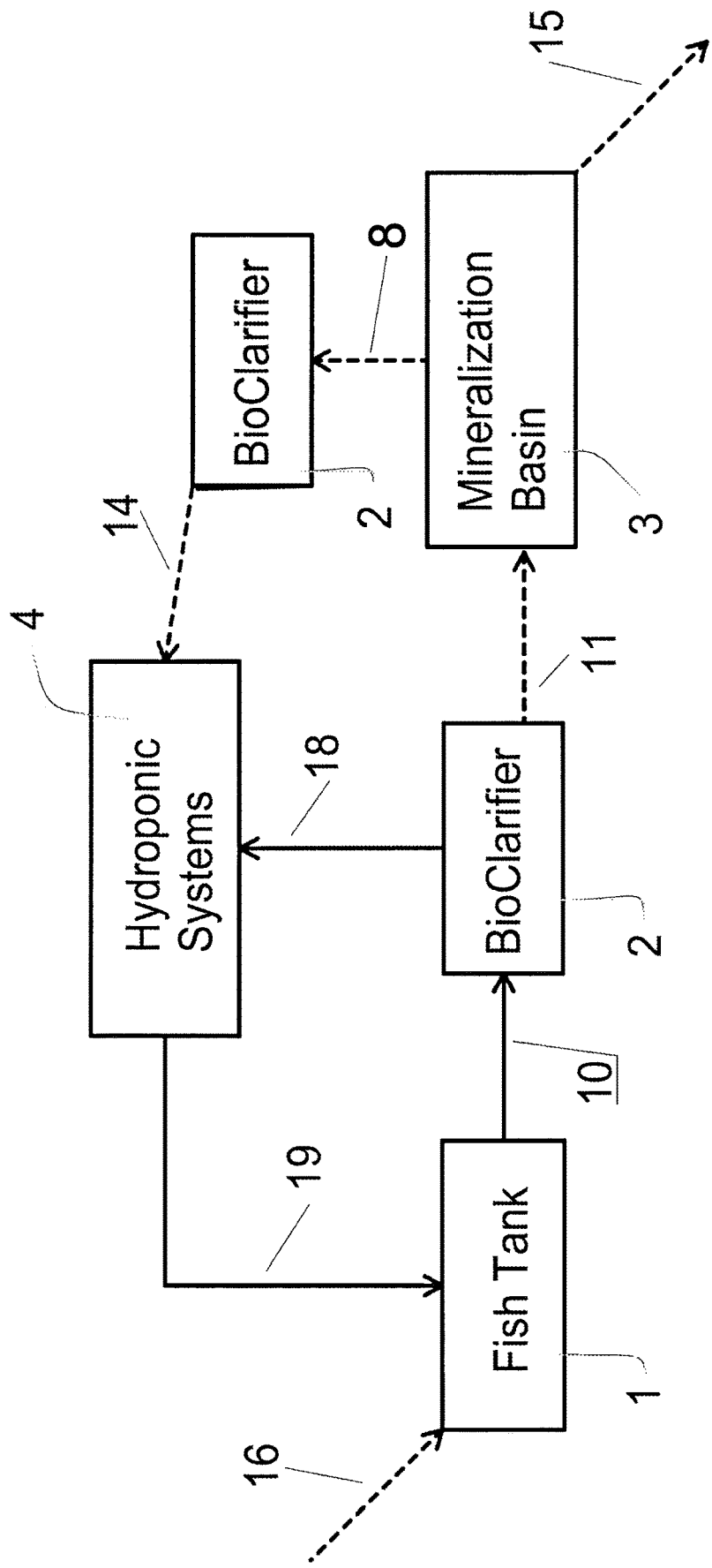
Figure 1C: Prior art

AQUAPONIC NUTRIENT GENERATION MODULE

I. CROSS REFERENCE TO RELATED APPLICATION

This application claims the priority benefit under USC § 119 to U.S. Provisional Application No. 62/846,148, filed on May 10, 2019, which is incorporated by reference herein in its entirety.

II. FIELD OF THE INVENTION

The invention is applied to aquaponic systems and methods in general and in particular embodiments, to decoupled aquaponic systems simplified by linkage of a bioclarifier and a mineralization basin.

III. BACKGROUND

Aquaponics utilizes the wastes produced as the byproduct of the rearing of aquatic organisms, principally fish, in a tank system. Early systems depended upon utilization of nutrients excreted by the fish directly into the water. The nutrient most likely to limit plant growth is nitrogen that can be utilized as ammonia (or its ionized ammonium ion) or nitrate. Nitrate is the oxidized end-product generated by the nitrification process. Approximately, ½ of the nitrogen excreted by fish is in the form of ammonia and ½ is organic nitrogen in a particulate form.

More recently, scientific studies have shown that collecting the sludge and digesting it (mineralization) can solubilize the organic nitrogen into soluble forms of nitrogen. Organic nitrogen is generally nitrogen bound with carbon chains and in particular, proteins and other forms of amino acids. Aerobic mineralization can produce nitrate as an end-product, whereas, anerobic mineralization tends to remove nitrate while producing ammonia as an end product. Proper mineralization can increase the nitrogen production from a given poundage of fish by about 40%. Aerobic mineralization that preserve the tank nitrate can increase the nitrogen supply by nearly a factor of 1.4.

Waters from the fish tank and/or the mineralization system are fed into plant holding systems that expose the roots to the nutrient rich water. At the microscopic level, each root fiber is coated with a water boundary layer, a zone of static water a few hundred microns thick. Nutrients must diffuse through this layer. If the water boundary layer is thick, the nutrient diffusion can limit the growth of the plants. For this reason, in shallow trays the systems are often aerated with air stones creating micro-turbulence which tends to erode the water boundary layer shortening the diffusion distance.

The discharge of suspended solids into the plant system from the tank of the mineralization basin leads to the accumulation of solids on the plant root fibers aggravating the diffusion problem by occluding the nutrient diffusion and by causing deepening of the water boundary layer. Thus, the discharge of suspended solids into the plant component should be avoided. This tendency can be offset by the addition of a secondary filter between the tank and/or mineralization basin and the plant holding systems. However, the use of the secondary filter induces additional capital and labor costs.

The prior art is dominated by the original configuration developed in the Virgin Islands and is described as a "coupled" aquaponic system consisting of a fish tank 1 that is fed a daily ration of nutrient rich feed 16. A moderate flow of water 10 is passed to a settling basin 5 that is sized to achieve a removal of the majority of suspend particles greater than 100 microns. The recirculating flow is continuously transferred to the hydroponic system(s) 4 via recirculating flow 18 where the nutrients are absorbed by the plant roots. Early systems predominantly employed floating foam boards to support plants, so their roots extended into a tray of recirculating water. In this configuration, ammonia that was not directly absorbed into the roots was nitrified to nitrate providing the biofiltration required to purify the water for the fish. The nutrient depleted water was returned to the fish tank via flow 19 completing the recirculation loop. The removal efficiency of the settling basin is low for fine particles (<100 microns) and they tend to accumulate in the system, ultimately being captured in the root structures of the plants which is considered undesirable. Additionally, operation of the system is dependent on the plant roots. If plant production is disrupted, the fish tank ammonia and nitrite levels grow unacceptable. These early systems normally produced particularly hardy fish, such as tilapia, that are known for their tolerance of poor water quality conditions. The coupled aquaponic system remains the dominate configuration for small aquaponic operations.

With the recent recognition of the nutrient loading advantage that can be obtained by mineralizing sludge captured in the settling basin, the "mineralized" coupled systems began to emerge. FIG. 1B illustrates a common configuration. Here the fish tank 1 is linked by recirculating flow 10 to the settling basin 5 where the larger solids are removed. The recirculating flow 20 then passes the water to a biofilter 6 where the key biological nitrification is accomplished, typically by a fixed film bioreactor, before the water is passed to the hydroponic system 4 where the nutrients are absorbed by the plants. The water exiting the hydroponic system 4 is returned to the fish tank via recirculating flow 19. The addition of the biological filter to the recirculating loop has the advantage of removing the dependency of the fish system on the nitrification on the plant roots. Under this approach, the sedimentation basin 5 is intermittently cleaned sending the solids to a mineralization tank 3 via flow 21. The mineralization basin 3 is operated aerobically or anaerobically to decay the solids with the intermittent discharge sludge flow 15 controlling the degree to which the sludge is digested. The overflow from the mineralization basin 3 is passed to the hydroponic system 4 by intermittent flow 14. The addition of the mineralization basin 3 approximately increases the nitrogen availability by 30% from a given feed rate 16. However, this mineralized coupled system is also plagued with solid accumulation issues on the plant roots as neither the settling basin 5 nor the mineralization basin 3 were effective at controlling the fine suspended solids.

The implementation of floating bead bioclarifiers 2 to control the fine solids at two critical points is illustrated in FIG. 1C. These systems employ floating plastic media with diameters of 1-5 mm, often shaped to enhance fixed film biofiltration capacities while removing solids down to 30 microns on a single pass. Receiving the flow 10 from the fish tank 1, the bioclarifier 2 effectively provides for nitrification and solids removal as the recirculation flow 18 is passed to the hydroponic systems 4. Intermittently, a concentrated flow of solids is passed to the mineralization basin 3. The addition of the dilute solids, typically less than 1 percent solids, to the mineralization basin 3 forces an overflow of water from the mineralization basin. The mineralization basin 3 is normally internally partitioned to reduce the solids concentration from a mixed liquor concentration of <2 percent (<20,000 mg/l) to perhaps 100 mg/L as it is passed via flow 8 to the bioclarifier where the solids are further reduced eliminating the majority of suspended particles >30 microns. Thus, both sources of water (flows 18 and 14) are effectively free of solids eliminating root fouling as an issue. In other configurations, the bioclarifier 2 receiving flow 8 is linked to a sump where the flow can be continually recycling, virtually eliminating suspended solids in the flow 14. In all cases, the digested sludge is periodically removed by discharge 15. Although technically successful, the use of dual bioclarifiers is only rarely employed because of the capital cost associated with the two filtration units.

IV. SUMMARY SELECTED EMBODIMENTS OF THE INVENTION

Several embodiments presented here, focus on the development of a nutrient rich water supply from the fish system that is virtually free of suspended solids. The approach utilizes a floating bead bioclarifier previously described (e.g., U.S. Pat. Nos. 5,770,080 and 6,517,724) with a sludge compartment linked to an external mineralization tank (referred to interchangeably herein as either a "mineralization tank" or a "mineralization basin"). The flow of sludge into the mineralization tank and the return of nutrient rich water is driven by the reciprocating pneumatic pressures generated as part of the bioclarifier's backwashing sequence. The nutrient rich waters are returned beneath the bead bed and are filtered prior to returning to the fish tank or partially diverted to the plant systems. In this manner, solids free nutrient rich waters are generated without the cost of additional water filtration components.

Certain embodiments of the invention described herein include aquaponic systems and methods that address the aforementioned needs. One configuration of the invention employs a fish tank which is fed a nitrogen rich food that is consumed by the fish. The fish generate wastes in the form of ammonia-nitrogen and particulate organic nitrogen that are dissolved and suspended in the water column. Water is circulated to a granular floating bead bioclarifier that concurrently captures the suspended solids while providing a fixed film biological format for oxidation of ammonia to nitrate and the oxidation of organic compounds to carbon dioxide and water. Water passing through the filter is generally returned to the tank via a water pump or airlift. Intermittently, as the bioclarifier is backwashed and exchange of water and sludges occurs between the attached mineralization basin and bioclarifier such that there is net movement of sludges into the mineralization basin with a return of nutrient rich water to the bioclarifier where it joins the recirculating flows prior to filtration.

The fish tank should be sized and aerated to support sufficient fish at a moderate density to consume enough food to generate the quantity of nutrients required for the hydroponic compartment. It should be plumbed to allow the recirculation of a high flow between it and the bioclarifier so that oxygen as well as waste products can be rapidly transported to the bioclarifier for reconditioning. Fish tank turnover times are in range 30 minutes to an hour. The bioclarifier is sized to provide solids capture, oxidation of dissolved organics, and nitrification for the fish in the tank. The bioclarifier is configured to undergo a pneumatic air wash that periodically moves the captured solids out of the bed's interstitial voids to a lower internal sludge compartment where the solids are temporary captured and concentrated. The temporary sludge compartment is connected to an external mineralization tank via a single pipe. During a backwash event, accumulated air is first released dropping the pressure in the filter hull drawing nitrogen rich waters from the mineralization basin into the filter hull, then as the filter hull refills and pressure increases, the flow reverses scouring sludge from the temporary sludge basin transporting solids the mineralization basin. The exchanged waters are trapped beneath the granular bed where they will settle prior to passing through the bead bed as part of the next backwash sequence.

The third principal component is the mineralization basin that is sized to receive the waste solids and hold them for digestion. In a preferred configuration, an aerobic sludge digester is sized to maintain a mean sludge residence time of about 10 days to achieve a 50% reduction in solids by volume. An additional desirable feature of the sludge mineralization tank is the ability to produce a clarified effluent water typically accomplished by a small clarifier compartment that is not subject to the turbulence created by aeration.

The coordinated utilization of the fish tank, bioclarifier, and mineralization basin flow produces a flow of nutrient enriched water that is free of suspended solids for dosing of attached hydroponic systems. This is accomplished with a minimum of capital investment and requires a negligible amount of labor since the key processes are driven by pneumatic pressures arising from the filter's backwashing mechanism.

V. BRIEF DESCRIPTION OF THE DRAWINGS

FIG. 1C illustrates a prior art mineralized coupled aquaponics system employing a bioclarifier for fine solids control.

VI. DETAILED DESCRIPTION OF SELECTED EMBODIMENTS

Figure 1A:
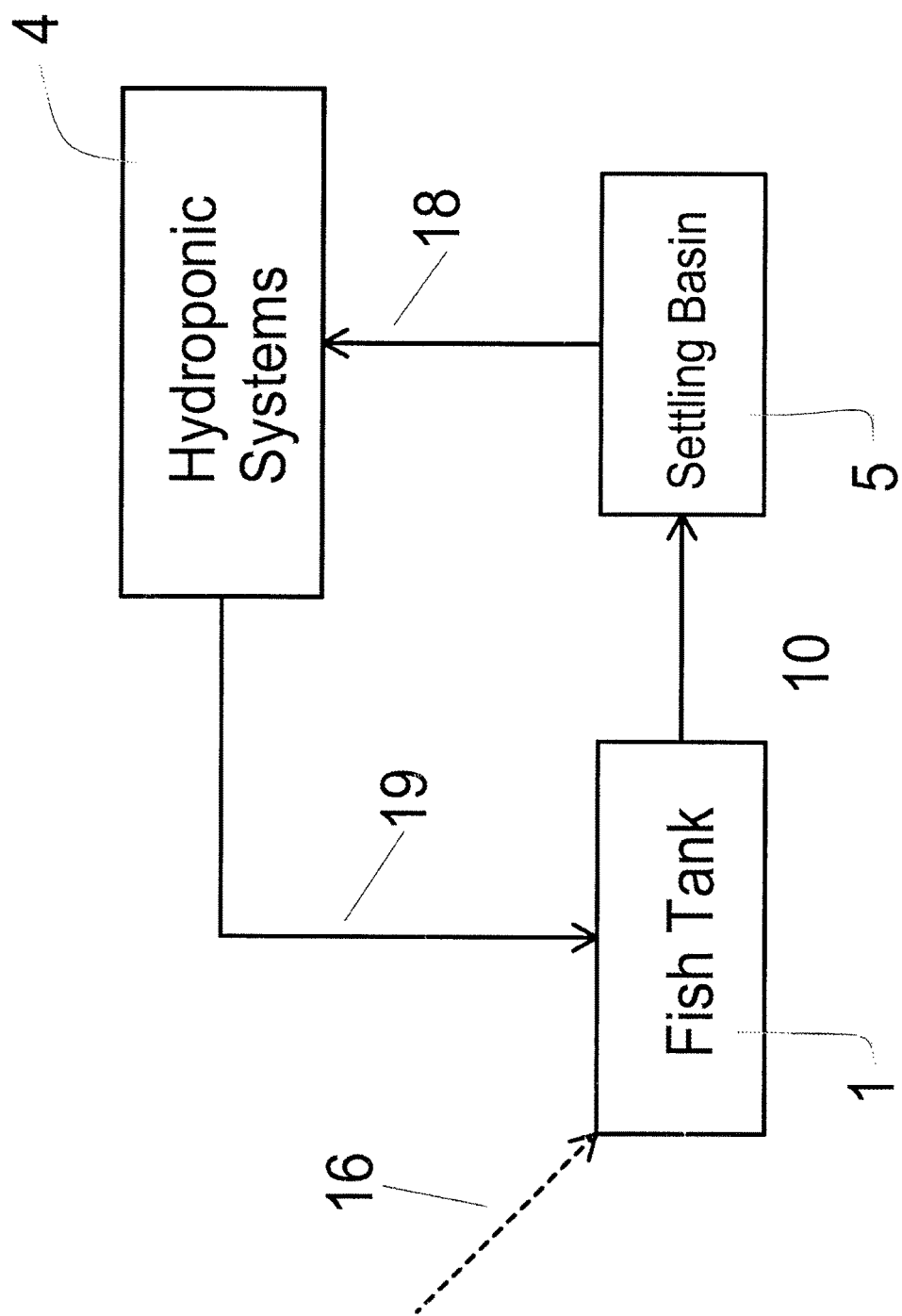
FIG. 1A illustrates a prior art coupled aquaponic system.
Figure 1B:
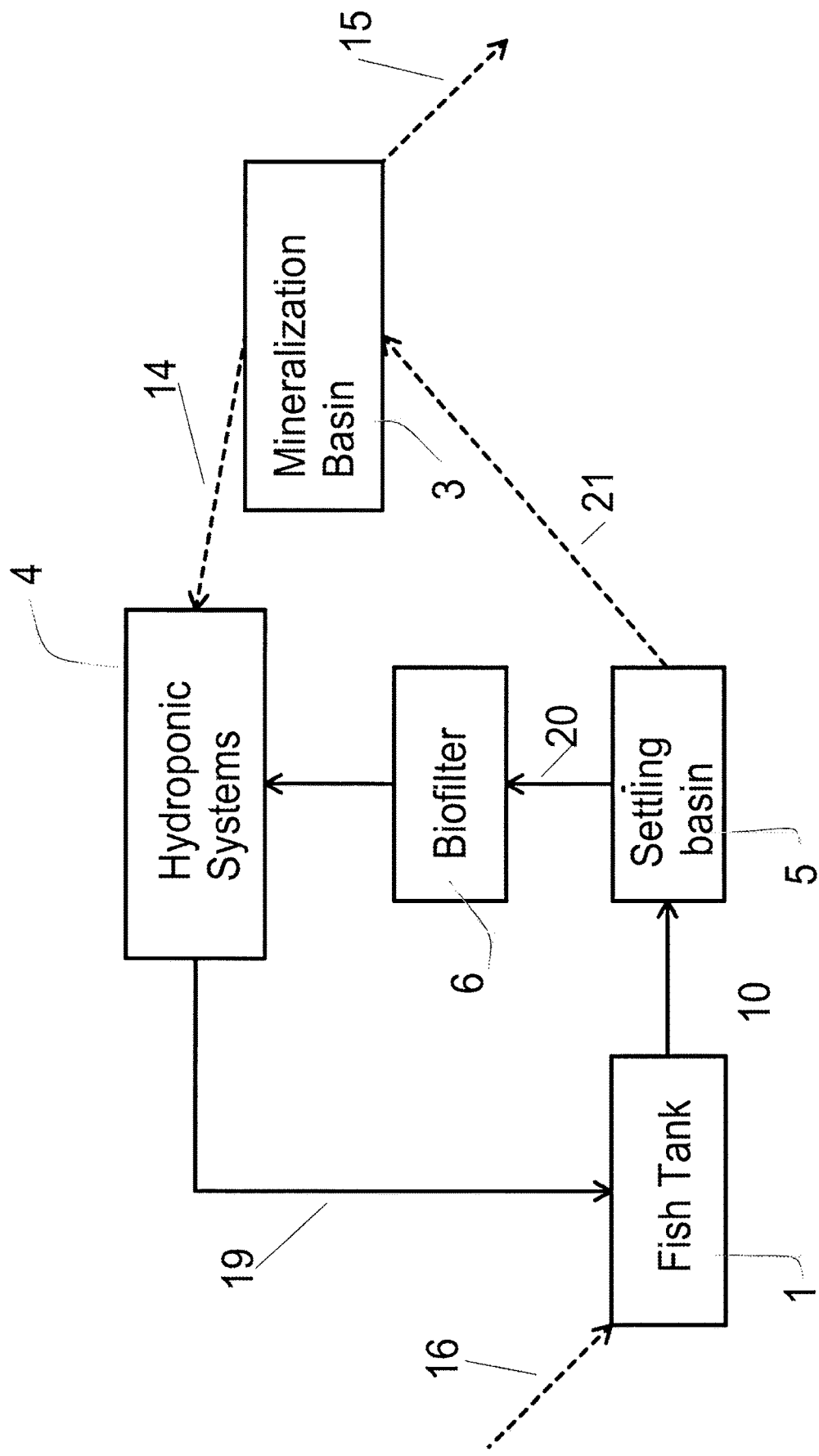
FIG. 1B illustrates a prior art mineralized coupled aquaponics system.
Figure 2A:
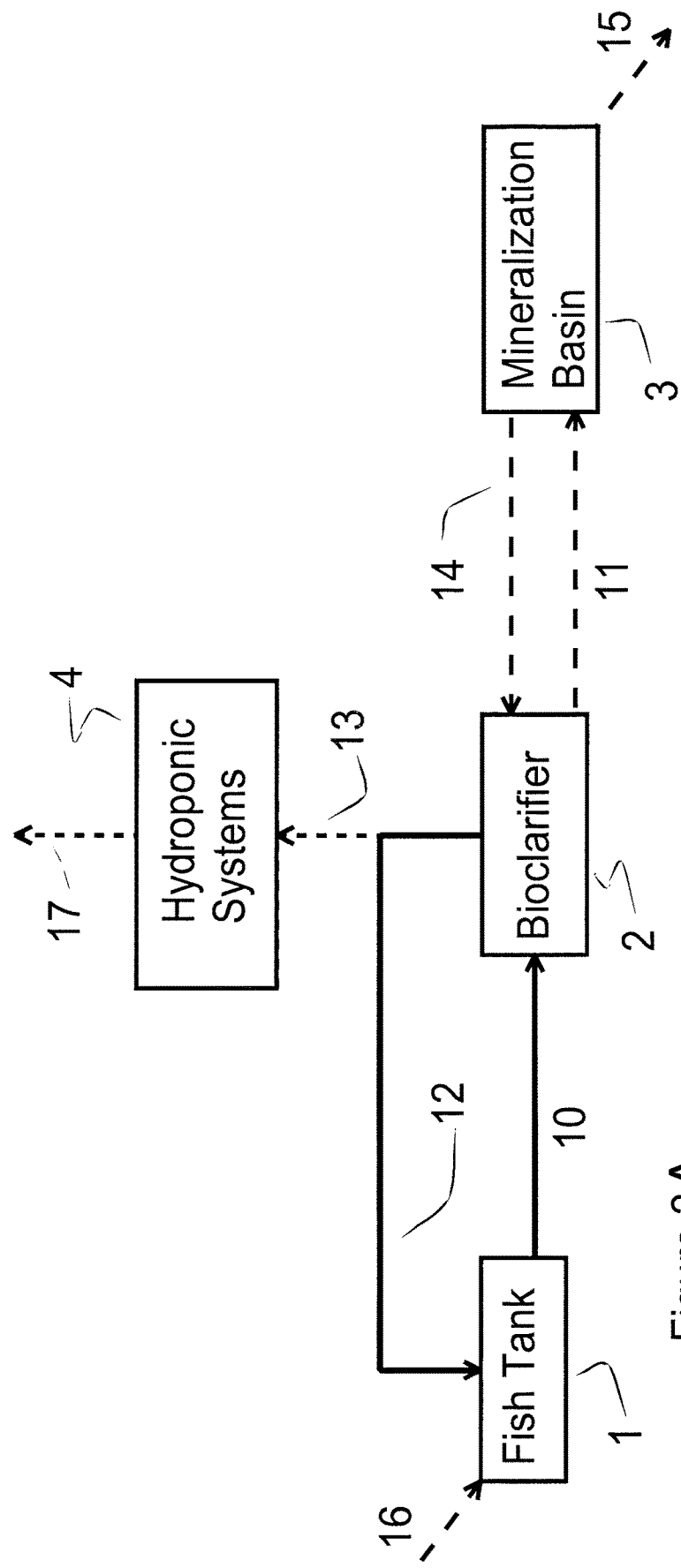
FIG. 2A illustrates flow patterns for one mineralized decoupled system of the present invention.
Figure 2B:
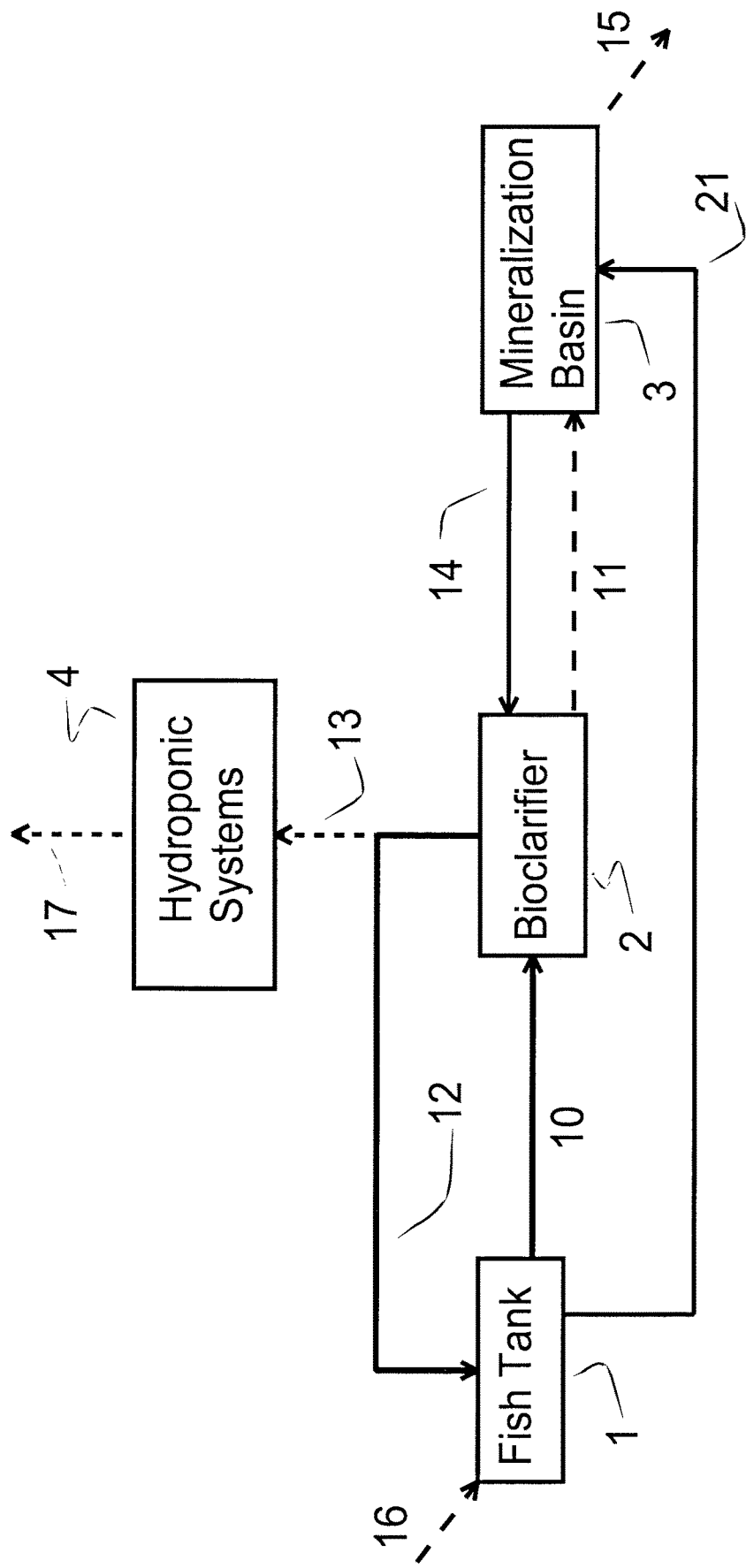
FIG. 2B illustrates the FIG. 2A embodiment with an additional slip stream flow path.

One aspect of the invention is to reduce the costs capital and labor associated with the control of solids in a mineralized aquaponic system. The recent development of floating bead bioclarifier technologies (e.g., U.S. Pat. No. 10,112,855, which is incorporated by reference herein) with pneumatic discharge features facilitates one preferred configuration illustrated in FIG. 2A. Here the fish tank 1 receiving food feedrate 16 and the bioclarifier 2 (e.g., see U.S. Pat. No. 10,112,855) are connected by a high rate of recirculation flow 10 of the order of 5 to 15 gallons per minute per pound of feed fed daily (with a broader range including anywhere between 5 and 80 gpm/lb daily). The media volume of the bioclarifier may be on the order of 1 ft3 for each 5 to 15 gpm of expected recirculation flow 10 or alternatively, 1 ft3 for each pound of feed. As used herein, "fish tank" means a tank designed to hold, or holding, any type of aquatic species, whether a "fish," shrimp, lobster, crawfish, other crustaceans, mollusks, turtles (reptiles) etc. and either in fresh water or salt water. This tank may also sometimes be referred to as a "growth tank." The bioclarifier provides for nitrification and solids control filtering of the water in the fish tank every 20-60 minutes (e.g., one tank volume every 20-60 minutes) depending on the species and density of fish. Intermittently, as a consequence of periodic backwashing of the bioclarifier, a small concentrated flow of solids rich water or "sludge" (typically anywhere between 0.5 and 8 percent solids) passes to the mineralization basin 3 via intermittent flow 11. This is a small flow of as little as about $1/5000^{th}$ to $1/1000^{th}$ of the daily recirculation flow 12 (e.g., flow 11 being about 1 to 5 gallons per day per pound of feed fed daily). As used herein, a "mineralization basin" or "mineralization tank" is a volume of water in which particulate matter (usually organic) is broken down into dissolved matter (usually inorganic) by microorganisms. In a preferred configuration, the mineralization basin 3 provides for aerobic digestion of the solids with a solids residence time of at least 17 days providing for sludge mass reduction of 60-70 percent, although the unit can be operated with a wide range of sludge residence times to achieve partial or more complete digestion (e.g., anywhere between about 5 days to about 40 days). Typically, the sludge mineralization basin 3 is designed to contain a barrier that reduces the turbulence near the basin overflow to reduce solids leaving the system. This overflow, as with most settling basins, should provide substantial removal of suspended solids down to a particle size of 100 microns although the system can operate with mineralization basins with poor particle removal perhaps releasing particles >1,000 microns in diameter. At some point in the backwash sequence, overflow from the mineralization basin 3 is returned to the bioclarifier 2 upstream of or beneath the bead bed where is will be re-filtered as it blends with the much larger recirculation flow 12 which returns to fish tank 1. The objective of the exchange is to achieve a net movement of solids into the mineralization basin. The exchange being defined by the high solids loading associated with flow 11 into the mineralization basin and the lower solids loading of the returning flow 14 to the bioclarifier. In effect, the solids loading associated with inflow 11 must be greater than (preferably much greater than) the solids loading associated with outflow 14. It will be understood that outflow (or returning flow) 14 acts as a return loop ultimately terminating into the fish tank. In some instances, this return loop may be directly back to the fish tank, but in other instances the return loop may be indirect, e.g. with outflow 14 first traveling through an aquaponics bed or a ultra-violet sanitizing station prior to returning to the fish tank. In certain embodiments, the solids loading ratio between inflow 11 and outflow 14 ranges between 5:1 and 500:1 (or any subrange in between). An objective achievable since any particles >30 microns will be captured by the bioclarifier 2 in effect rejecting the solids back to mineralization basin 3. This approach renders the inefficiencies associates with the rudimentary clarification associated with settling harmless to the overall process. The blended flow 12 now comprised of a blend of flow 10 and 14 returns to the fish tank relatively devoid of ammonia and suspended solids but somewhat enriched by nitrates and other critical nutrients. Alternately, some of this flow can be diverted via flow 13 as needed to provide nutrients for the growth of the plants in hydroponic system 4. The magnitude of flow 13 is again small compared to the recirculating flow 12 (e.g., 0.1% to 1%), the constant addition of nitrates to the recirculating system will raise the nitrate concentration to a level of perhaps 200-500 mg-N/L greatly reducing the volume of water that may be required to provide the nitrogen loading required for the plants. In this preferred "decoupled" configuration any excess water (after consideration of evapotranspiration) added to the hydroponic system overflows where it is normally discharged from the system to prevent salt accumulations. In an alternate configuration, the flow 17 can be returned to the fish tank 1 mimicking the water conservation achieved with coupled designs. These embodiments allow the nutrient production to be maximized while minimizing the number and cost of system components. The advantageous nutrient contribution from the sludge digestion basin 3 is implemented without an increase in cost over more basic sediment laden configurations. FIG. 2B modifies the flow pattern to take advantage of the inherent nitrification capacity of the mineralization basin 3. Ultimately, virtually any Recirculating Aquaculture System (RAS) is limited in its capacity to hold fish and/or generate nutrients by its nitrification capacity. Recognizing that the capacity of our illustrated system is limited by the bioclarifier 2's nitrification capacity, usually defined by the media surface area to support biofilm growth, an inexpensive expansion of carrying capacity can be achieved by recognizing that biofloc contained in an aerobic mineralization basin 3 is inherently rich with nitrifiers (e.g., sufficient nitrifying bacteria or nitrifying capacity to convert at least 250 gm N per ft3 per day). Not only are the biofilms discharged from the bioclarifier 2 inherently nitrogen rich, but the continuous degradation of proteins within the basin releases ammonia to induce additional potential nitrifier growth. Thus recognizing that the mineralization basin represents a suspended growth or biofloc system with surplus nitrification potential, delivery of a slip stream flow 21 directly from the fish tank to the mineralization basin by a conduit (in effect bypassing the bioclarifier as seen in FIG. 2B) represents a very cost effective means to increase the fish carrying capacity of the RAS. "Bypassing" the bioclarifier does not necessarily mean the slip stream must always flow "directly" from the fish tank to the mineralization tank (i.e., the slip stream could undergo some intermediate treatment before entering the mineralization tank), only that the slip stream does not pass through the bioclarifier to the mineralization basin through the normal exchange mechanism which is extremely limited in volume (gallons/day). It is most effectively, a slip stream from fish tank 1 or a minor diversion from flow 10, but, could be directed from flow 12 whenever the ammonia concentrations in the system are high (>1 mg-N/L). The greatest benefit of 12 is realized whenever the ammonia transport into the mineralization basin (gm-N/day) is high.

Since the nitrifier biomass in the mineralization basin is very high, this potential benefit is likely limited by the transport capacity (defined by the production of the flow and the tank ammonia concentration) that can be achieved before the clarification capacity of the mineralization basin is overwhelmed by the flow input via conduit 21. The tank ammonia concentration is typically defined by the tolerance of the fish stock, usually in the range of 0.5-5 mg-N/L. It is beneficial to transport as much flow as is reasonable via conduit 21, but, when the clarification flow limits are considered, the higher range of flow rates achievable here are on the order of 1 to 5 five percent of the recirculation flow 12, i.e. typically 0.1 to 0.75 gpm per pound fed daily.

When the relative tank sizing is considered, the typical slip stream flow could transport 2-3 tank volumes per day via the conduit carrying slip stream flow 21. However, it is recognized that specific modification to the mineralization basin may permit substantial increases to flow 21. For example, increased modification of the mineralization base 3's aeration technique can allow the full cross-sectional area of the mineralization basin to be used when calculating the overflow rate (gpd/ft2), which in turn is used to calculate the flowrate the mineralization basin can accommodate before unacceptably high solids concentrations begin to be discharged back to the bioclarifier. And, further recognizing that any flow leaving the mineralization basin, flow 14, is further polished by the bioclarifier 2 as it re-enters the recirculation loop allows the flow 21 to be driven somewhat past the clarification capacity of the clarifier. And presuming a tolerant fish, such as tilapia, with relatively high ammonia tolerances (2-5 mg-N/L), increased fish stock carrying capacities of 20-30 percent are achievable by employing a slip stream flow 21. Correspondingly, nutrient production and plant production area increases of the same magnitude could be achieved while maximizing the flow 21 via the associated conduit.

Figure 3A:
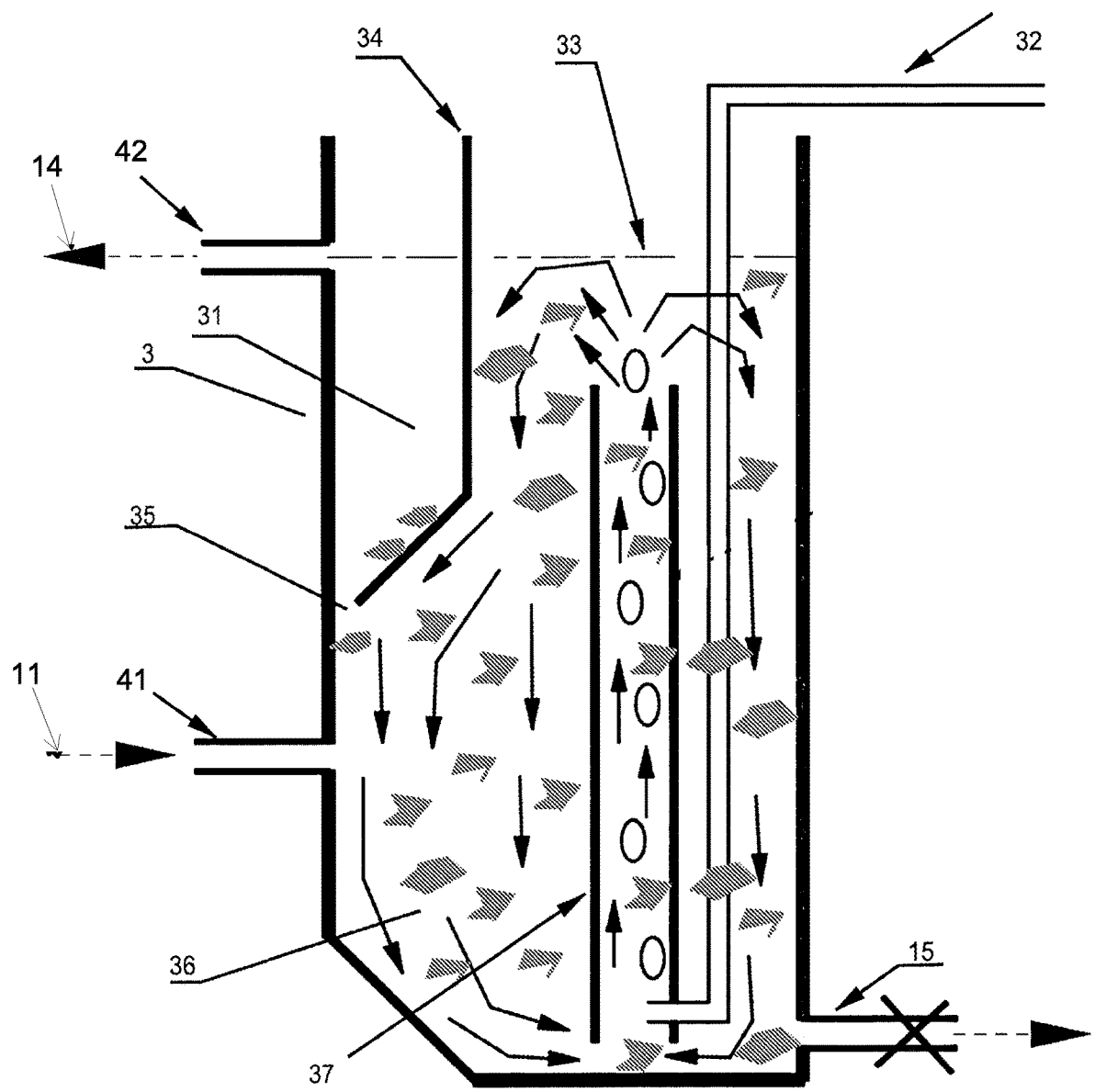
FIG. 3A illustrates a partitioned aerobic mineralization system of the present invention.

Referring to FIG. 3A, the mineralization basin 3 regularly includes a wall 34 that is designed to create a clarifier zone 31. It is designed to settle solids that enter through gap 35 that connects the sludge digestion zone to the quiescence zone 31 prior to, or upon, the addition of sludge input 11 from the bioclarifier via inlet 41 with the intent of dramatically reducing suspended solids content of flow 14 flowing out of the outlet 42. Typically, flow 42 is driven by a rise in the mineralization basin water level induced by flow 11. In the case where the inlet flow 11 is a pulse, the clarifier zone 31 has a volume that is greater than the input volume, then the settling occurs between pulses 11 assuring the displacement of largely clarified waters. In the case, where the input flow 11 occurs over a longer timeframe, then the clarifier 31 can be designed with an overflow rate between 300-600 gallons per square foot per day with the recognition that that the flow 14 will be subsequently passed through the bioclarifier 2 with a solids capture ability superior to the clarifier 31, whose main function is to assure that the solid mass transport into via flow 11 is greater than that of flow 14 leaving mineralization basin 3, thereby assuring a net removal of solids. In some configurations one pipe serves the function of transporting flow 11 and 14 sequentially, as will become more apparent in other embodiments of the invention. In an aerobic mineralization basin, solids are kept in suspension circulating around the sludge digestion zone 36 by the injection of air via line 32. The air acting to induce turbulence adding oxygen to the water while the bubbles absorb carbon dioxide produced by bacterial action. Removal of carbon dioxide helps avoid pH declines that could interfere with the digestion process. As, illustrated in FIG. 3A, an airlift 37 has been found to be an efficient way of directing the air to maximize scour of the lower section of zone 36. A continuous input of air near the bottom of the airlift draft tube 43 via air inlet of line 32 creates an air/water mixture with a lower density then the surrounding water column inducing mixing and gas exchange in a cost-effective manner. Maintaining oxygen levels in the mineralization zone 36 allow aerobic digestion to dominate the mineralization process. The aerobic mineralization process is approximately 3 times faster than anaerobic alternative, achieving ½ organic sludge reduction in about 10 days at 20 C for aquaculturally produced sludges. The sludge age is defined as the ratio of the holding capacity of zone 36 divided by the rate of mineralized sludge removal via flow 15. The process can be conducted with minimal odor generation and generates nitrate by the aerobic process of nitrification. And, finally the suspended growth aerobic process does not produce bulking sludges that can defeat the clarifier zone 3. For these reasons, an aerated mineralization is the preferred method of sludge mineralization.

Figure 3B:
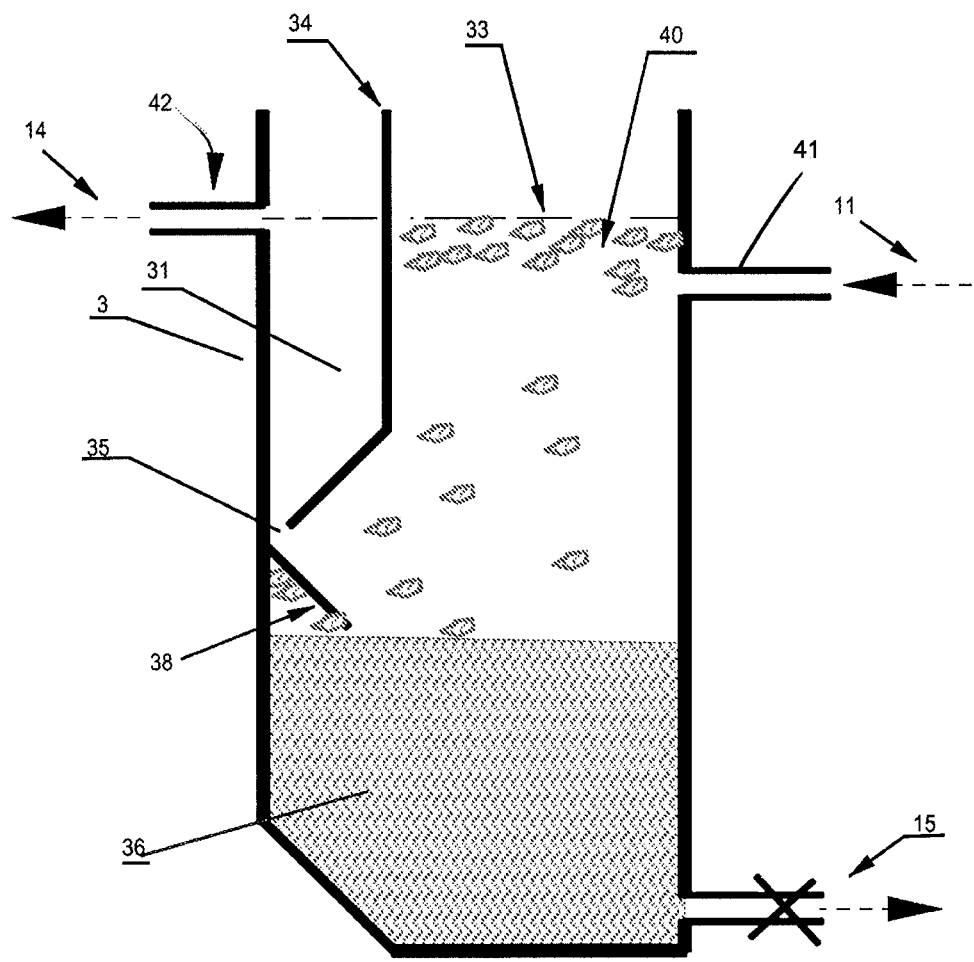
FIG. 3B illustrates a partitioned anaerobic mineralization system of the present invention.

In contrast, a partitioned anaerobic mineralization basin (FIG. 3B) allows the influent solids to settle forming a sludge digestion zone 36 consisting of a bed of slowly consolidating solids. The whole interior of the mineralization basin 3 acts as a primary settling basin. In other embodiments, the sludge digestions zone may be continually or intermitting mixed without the addition of oxygen to avoid stratification of the solids in zone 36 and accelerate digestion. The anaerobic process is slow and even mixed anaerobic mineralization basins must be sized to provide for sludge residence times approaching 60 days at 20 C to achieve a ½ reduction in organic sludge mass. The sludge age is controlled by the rate that mineralized sludge is removed via port 15. Anaerobic sludge digesters are sized with volumes between 20 and 30 gallons/lb feed fed daily taking advantage of relatively high degradation rates that occur with the first few weeks of breakdown. These reactors, however, only realize about 25% of the volatile solids degradation. The hydraulic operation of this embodiment is essentially the same as the aerobic configuration, a flow or pulse of flow 11 entering port 41 raises water level 33 inducing a flow 14 out of outlet 42. The clarifier zone 31 is defined by partition wall 34 and gap 35. The design is somewhat complexed by the tendency of anaerobic decaying sludges to produce gas bubbles that become entrapped in the sludge causing same clumps of sludge to float, or bulk. Bulking sludges tend to accumulate at the near the water surface 33 forming a layer of bulking sludge. Bulking sludge formation directly under the gap 35 can defeat the clarification zone 31, so the gap 35 is protected by a solids deflector 38 that captures or deflects a rising particle so can impinge on barrier wall 34. This anaerobic embodiment does not require the significant input of any energy for aeration, but tends to strip nitrates through the denitrification process devaluating the nitrogen content of the aquaculture waters. Once the nitrates are stripped from a particular layer, then sulfate is reduced to sulfides creating an odor problem. The anaerobic processes produce ammonia as an end product, a preferred nitrogen source for some plants, and these units tend to solubilize phosphorus and metals. These secondary releases can improve plant appearance or growth beyond that realized by nitrogen enhancement alone.

Figure 3C:
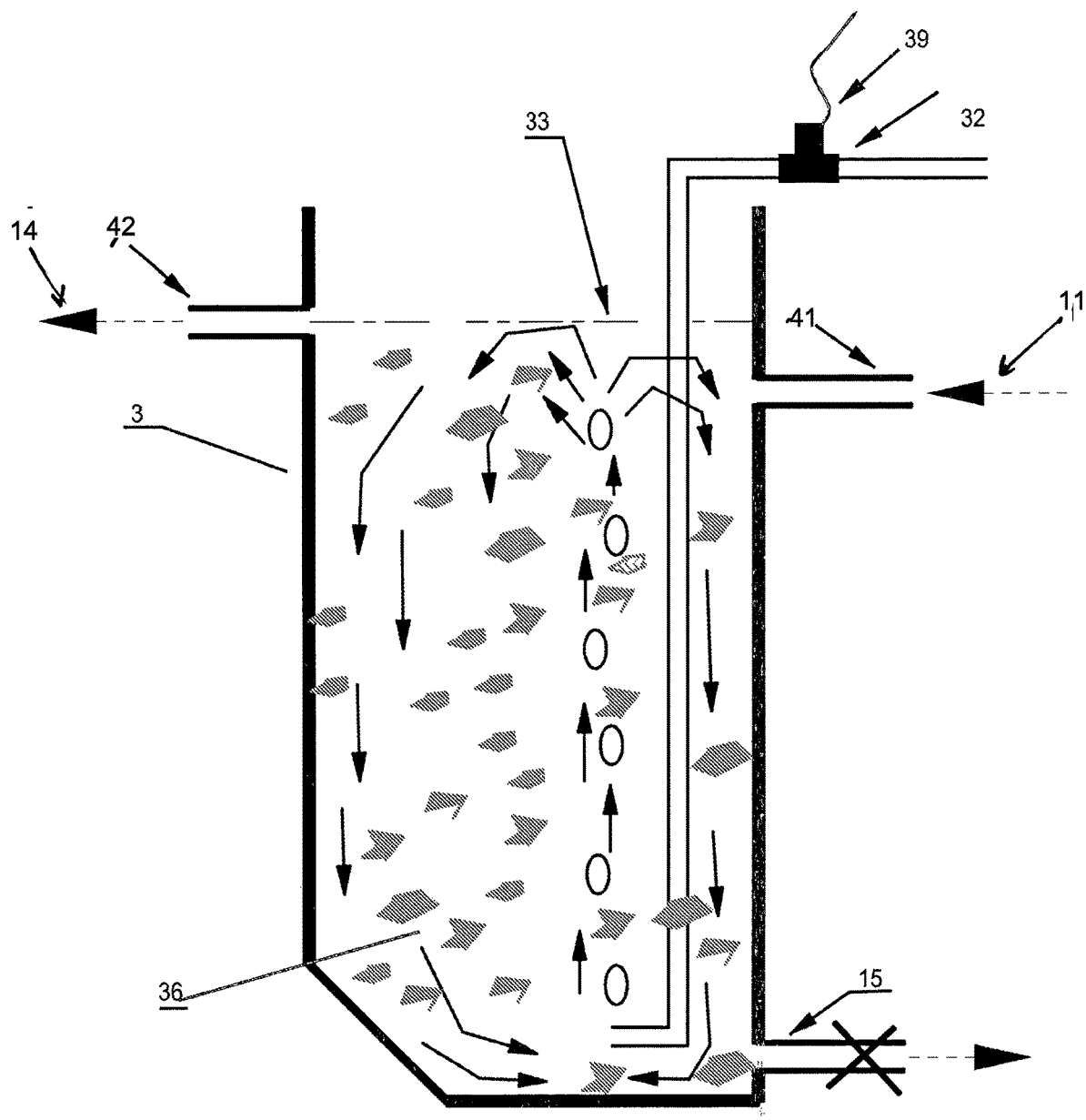
FIG. 3C illustrates a sequentially aerated mineralization basin of the present invention.

FIG. 3C illustrates another preferred embodiment of the mineralization basin 3. Here, the basin 3 is aerated by a simple air injection line 32 to induce air bubble input near the bottom inducing aeration and mixing. In some embodiments, air is injected through an air stone, perforated tubing or other device that improves gas transfer characteristics. Here the air injection line 32 is controlled by an normally open electric valve 39 attached to a control board or simple timer. Between 1 and 30 minutes, and more preferably between four to five minutes prior to a flow 11 input event, the air input is shut off converting the mineralization basin 3 temporally into a settling basin clarifying the upper reaches of the basin. In this manner, a flow 11 through 41 will induce a rise in level 33 causing a reasonably clear discharge 14 through 42. Also, at this time, excess sludges can be removed via port 15. This approach achieves a good separation of solids provided the input of flow 11 is relatively small compared to the volume of the settling zone 31, e.g., between 5% and 10%. Of course, a sequentially aerated basin can be equipped with a partition, as previously illustrated to further improve solids separation. In some, embodiments a sequentially operated mineralization can be operated to achieve secondary goals by producing a blend of aerobically and anaerobically digestion products. These secondary goals can be achieved by adjusting the timing of aeration to induce various degrees of oxygen depletion.

These three configurations represent a wide variety of mineralization basins 3 that can be configured to function in an aquaculture nutrient generation module. Many embodiments can be envisioned that employ improved partitions, aeration durations, sequential control operations, and mixing techniques that meet the primary objective of a mineralization basin 3 to capture and digest solids while accumulating nutrients, principally nitrogen, in the return flow 14. Preferred configurations will demonstrate high rates of solids capture (much lower solids in return flow 14 relative to sludge input flow 11) with a secondary importance assigned to the absolute solids levels suspended in flow 14, since flow 14 will have most residual solids removed by being filtered through the media bed before reaching a hydroponic system.

Figure 4A:
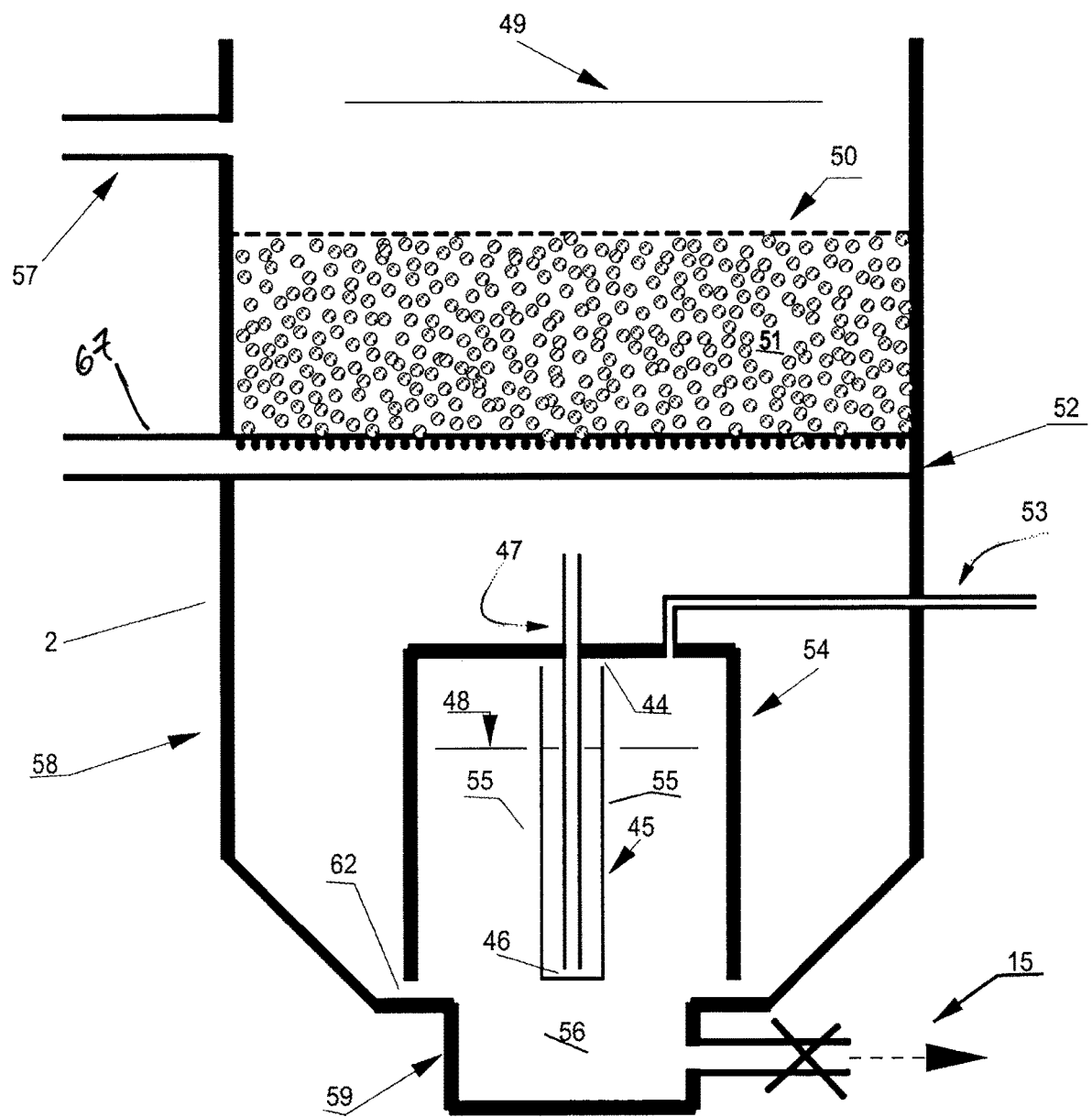
FIG. 4A illustrates a pneumatically washed floating media bioclarifier of the present invention.

FIG. 4A illustrates a bioclarifier or "bead filter" 2 in a concentric format that is representative a variety of airlifted, gravity fed bead filters used in the aquaculture industry. Waste water (e.g., from the fish tank) is directed through an influent inlet 67 to the inlet diffuser 52. These floating bead filters utilize a fine screen 50 to trap a bed of floating beads above the inlet diffuser 52 and below the effluent outlet 57. The bed consisting of small beads typically 2-5 mm in diameter formed in a low-density plastic (specific gravity typically between about 0.8 and 0.96) that stack beneath the screen to form a static bead bed 54 that supports the granular filtration process. Low density polyethylene with a specific gravity near 0.92 is preferred because of its durability. In some, cases, the nearly spherically beads are reformed to enhance the ability of these filters to support rigorous fixed film biofiltration processes including nitrification.

A charge chamber 54 is positioned beneath the bead bed and is equipped with a trigger 55. Air inlet 53 provides a steady flow of air that slowly fills the air tight charge chamber 54 with air. An internal air surface 48 is formed as the water is displaced downward as it escapes though gap 62. The trigger 55 is configured to hold the air until it nearly escapes the air chamber, then to suddenly release the air beneath the bead bed where it churns the bed shearing accumulated biofilms and captured solids. In this configuration, the trigger discharge conduit penetrates the top of the charge chamber in a manner that maintains and airtight seal. Inside the charge chamber 54 the lower end of the conduit 47 is incased with an outer casing 45 with a sealed bottom and open top. The outer casing is sized so that is leaves a gap 44 at the top and a gap 46 between the bottom of the outer casing 45 and the lower end of conduit 47. During normal operation the trigger is sealed by the counterweight of water contained in conduit 47. As air is forced into charge chamber 54, air is accumulated until the air surface 48 reaches the gap 46. Within a few moments, a bubble will form rising into conduit 47 reducing the density of the column of water within the conduit. The counterweight of the column is thus undermined, and the trigger suddenly discharges the air contents of the charge chamber 54. As the trigger discharges air the water pressure defined by water level 49 rapidly fills the charge chamber 54 carrying with it the solids displaced by the temporarily dispersed bead bed. Thus, at the end of a backwash event, the charge chamber is filled with dirty backwash waters. The discharge ends when the gap 44 is flooded forming a new seal when conduit 47 is again filled with water. The volume of air discharged during a backwash event typically approaches the volume of beads held in the unit. The loss of the air from the charge chamber 54 induces a dramatic drop in the water level 49.

In the period between backwashes, usually measured in hours, the suspended solids captured in the charge chamber settle out into the lower reaches of the filter hull 58, ultimately consolidating into a sludge concentration space or sludge chamber 56 defined by vertical walls 59 below gap 62. Periodically, the sludge is removed through a sludge discharge pipe, normally controlled by a manual or automated valve. Sludge removal frequency and sludge discharge rates are largely controlled by the holding capacity of the sludge chamber 56 and loading rates to the bead filter 2. Typically, sludge removal will occur at the same interval as backwashing, or, when the loading is moderate only after several days of backwashing events. There are many other bead filter configurations that employ a charge chamber equipped with a trigger to effectuate washing for the bead bed while providing a means to separate solids while recycling the backwash waters. Many of these units are configured to drop the water surface 49 substantially below the screen as part of the backwash process.

Figure 4B:
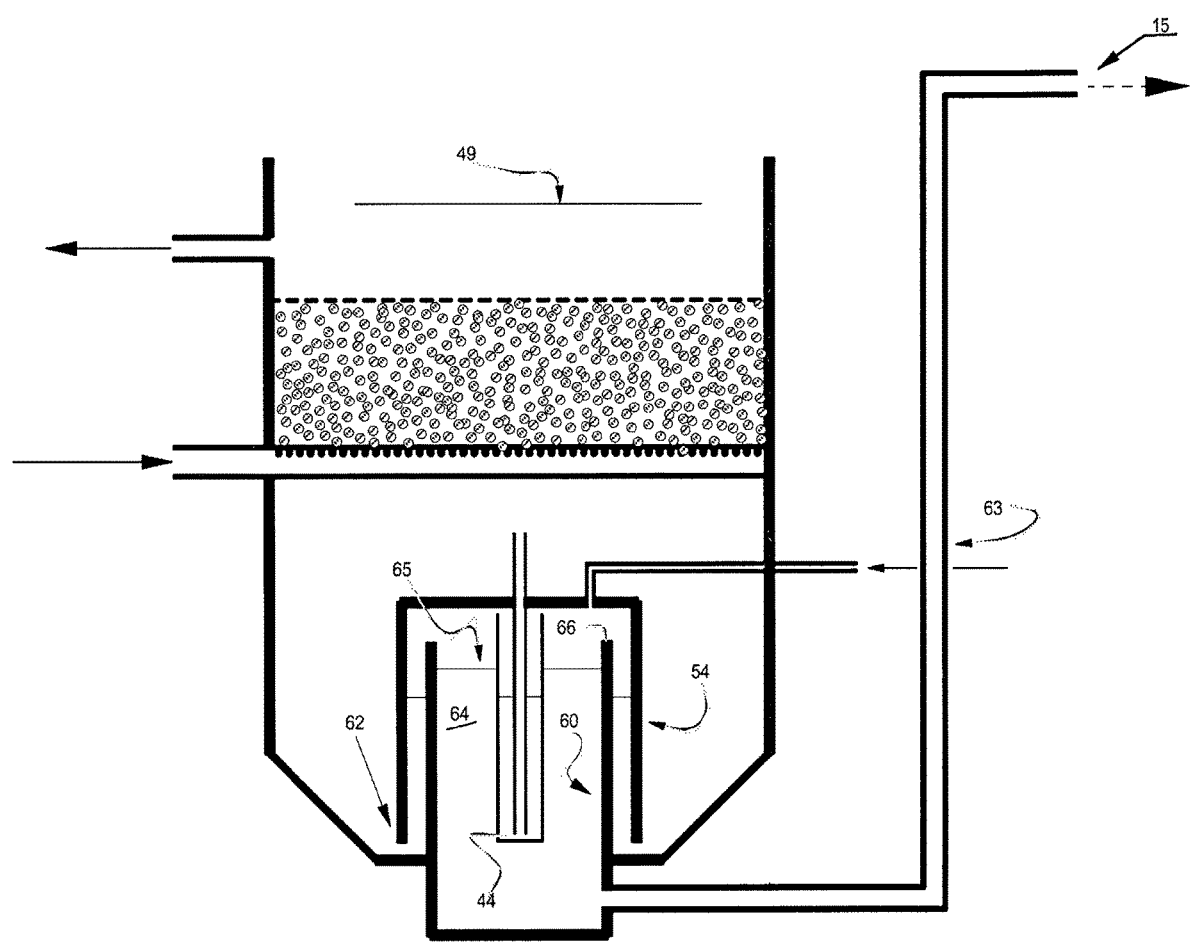
FIG. 4B illustrates the FIG. 4A embodiment with a pneumatic sludge discharge chamber.

FIG. 4B represents a second floating bed filter configuration that differs from the previously described configuration only in the extension of the vertical wall 60 within the context of the charge chamber 54 to create a pneumatic sludge discharge chamber 64. The expanded chamber 64 is air tight with the sludge outlet flow 15 constrained only by the elevation of the sludge discharge. As a charge sequence proceeds, the extended wall prevents the escape of sludge laden waters under the lower lip into gap 62 of the charge chamber and the air surface 48 is split forming a second air surface 65 within the pneumatic sludge discharge chamber 64. The pneumatic pressures generated as charge chamber fills can be used in low lift applications to generate pressures within the sludge compartment 64 sufficient to lift a portion of the accumulated sludge out of an elevated conduit 63 that leads to the sludge discharge 15. Here the elevation of the sludge discharge 15 is set slightly above the maximum driving pressure anticipated below the inlet diffuser 53 (typically the elevation of the water surface 49 plus 6-12 inches). The pneumatic sludge discharge chamber can generate maximum lifts (above water surface 22 of the fish tank) approaching the distance between the top lip 66 of the extended wall 60 and the charge chamber's trigger point at gap 44. It can also be observed that this floating bead filter also effectuates a dramatic drop in the water surface 49. Many floating media filters that employ charge chambers can be modified to include a pneumatic sludge discharge chamber that can be used to advantage in the sludge removal process. The process is effective across a wide variety of charge chamber types employing a wide variety of triggers that vary not only in shape but also by the means of trigger release.

Figure 4C:
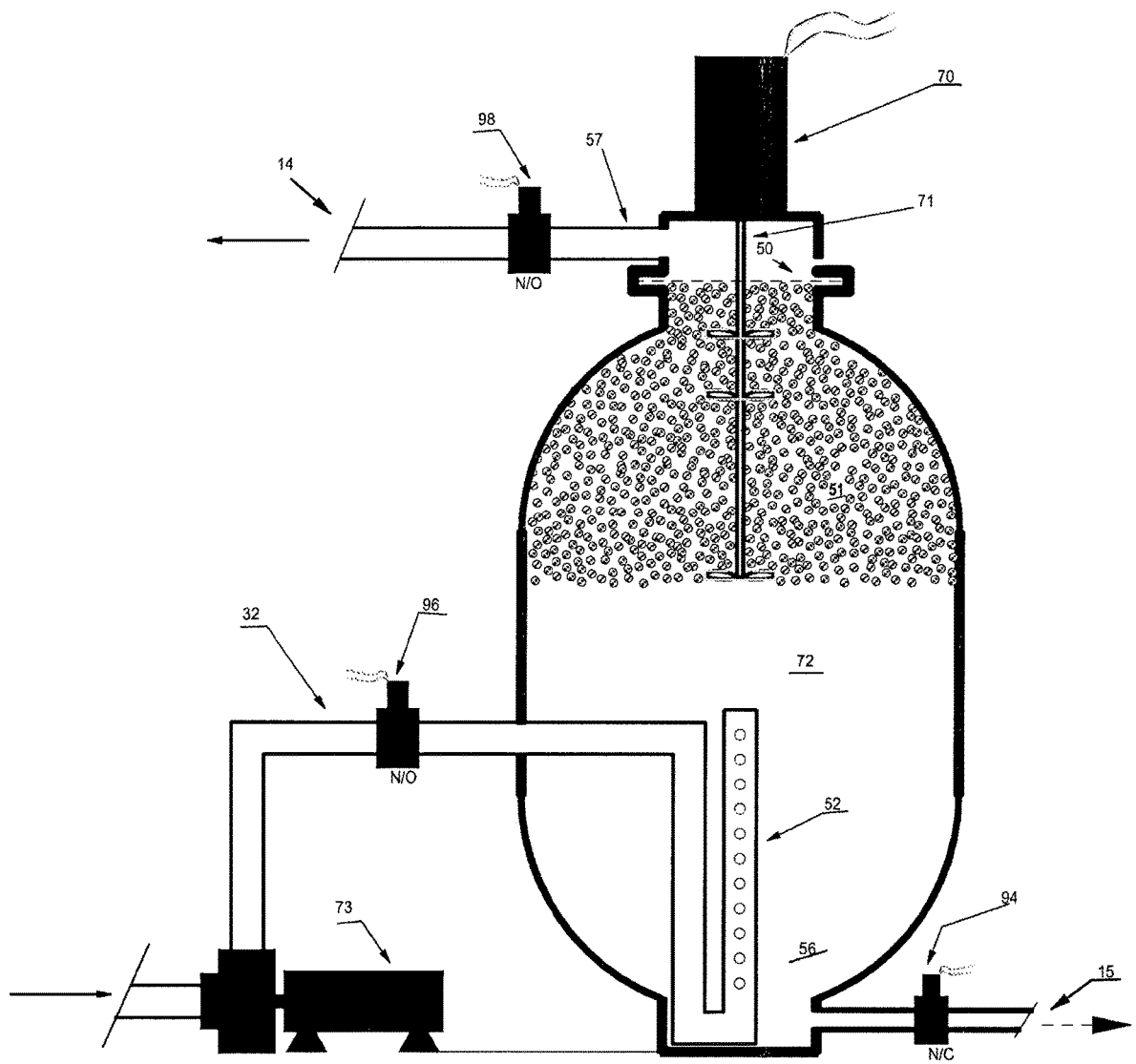
FIG. 4C illustrates a propeller washed floating media bioclarifier of the present invention.

FIG. 4C represents a broad class of floating bead bioclarifiers that are typically operated under pressure from a water pump 73. This pump provides the inlet 32 with a high flow of pressurized water that is distributed by an inlet diffuser 52 well beneath the bead bed 51. With electronic valves, in a normally open position, water is passed vertically through the bead bed 51 passing though the overlying screen 50 emerging through the effluent outlet 57. Typically, cylinder that the defines the side walls filter hull 58 is completed with dome shaped ends to resist peak pressures that typically range below 20 psi for aquaculture applications where electrical costs for continuous pump operation are of concern. The bed support both biological conversion of dissolved wastes and physical removal of suspended particles function common amongst all types of floating bead filters.

This particular filter configuration is equipped with a series of propellers attached to a propeller shaft 71 that is attached to a mixing motor 70 anchored onto the top of the filter hull. During filtration, the mixing motor is off and the bed is static. During a backwash, the pump is turned off and the propeller motor 70 is activated spinning the propeller shaft at about 3,500 revolutions per minute. This expands the beads into the expansion zone 72 separating the biofilm and accumulated solids from the beads. The motor is then turned off and the beads float back upward to reform the static bed. Solids now captured in the expansion zone 72 are allowed to settled forming (temporarily) a sludge compartment 56. After several minutes of settling, up to half the internal volume of the bead filter is removed through sludge discharge port 15, essentially removing all the solids generated by the wash. Although the details of the filter can vary widely, the illustrated configuration is representative of a wide variety for floating bed filters that operate under pressure and are backwashed after first disrupting the flow of the pump. The backwash can be implemented manually, but it is also common to operating the filter in an automated fashion by the addition of electronic control valves. A computer, control box, or timer box is then used to manipulate the valves 96 and 98, the pump 73, and motor to effectuate the backwash in many sophisticated manners. For example, automated backwashing can be triggered by a pressure switch or water can be redirected into the outlet during a wash event to create a downward water movement more fully flushes dislodge solids out of the bead bed. These automated sequences almost always verify the closure of the valve 94 placed on the sludge outlet flow 15, as a failure to close has been known to completely drained attached fish tanks. Similar control sequences could be illustrated for a variety of other mechanically washed, pneumatically washed, and hydraulically washed bead beds, but, it is understood that the configuration illustrated here merely represents that broad class of floating bead filters typically operated under the pressure of a water pump 73 and controlled through a series of automated/timed motors and valves to effect a backwash and remove sludge.

Figure 5A:
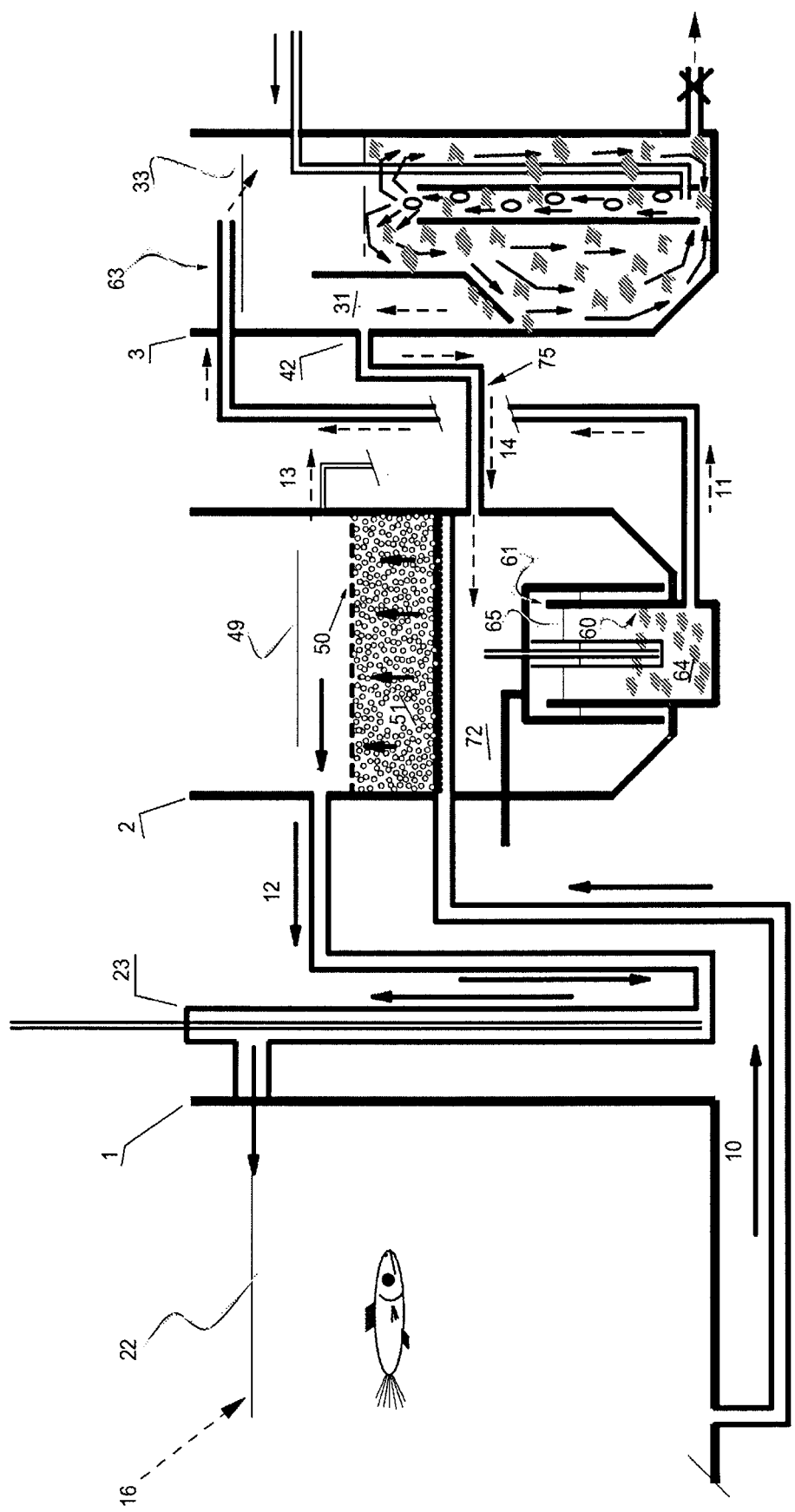
FIG. 5A illustrates an airlifted aquaponics nutrient generation system of the present invention.

FIG. 5A illustrates a preferred embodiment of the invention. This low head configuration consists of a fish tank 1 receiving a food feedrate 16 coupled with an open top floating bead filter 2 operated by an airlifted loop consisting of a gravity driven flow 10 and an airlift 23 assisted return flow 12. This main circulation loop operates off the action of the airlift 23 that discharges a high rate of water flow into fish tank 1 with the net effect of raising the fish tank water surface level 22 and lowers the water level 49 over bead filter 2. The elevation difference between the tank water surface 22 and water level 49 is variable, controlled by frictional losses associated with the flow 10 and head losses associated with water passage through bead bed 51. Bead bed head losses, vary from a few inches to perhaps 15 inches depending on the degree of solids accumulation and biofilm development occurring as a result of the feed rate 16 and the backwash frequency set for the system. In optimized designs, the head differential between surfaces 22 and 49 are held under 12 inches to conserve energy. In this preferred configuration the mineralization exchange loop is driven by a pneumatic sludge discharge chamber previously described (FIG. 4B). A partitioned aerobic mineralization tank or basin 3 (FIG. 3A) is paired with the open topped bead filter 2 by two connecting pipes. The first is elevated conduit 63 which represents the intermittent flow 11 that moves sludge from the bioclarifier 2 to the mineralization basin 3. As previously described, this flow occurs whenever conditions in the charge chamber force the water surface 65 below the upper lip 61 of the sludge chamber walls, creating pressures in sludge basin 64 sufficient to induce the sludge flow 11 onto water surface 33. This condition generally occurs in the second half of the air chamber charge cycle. Under typical operating conditions where the bead bed 51 is partially occluded by accumulating solids, the water surface 33 approaches the head pressure found in the expansion zone 72 that typically falls between the tank elevation 22 and the bead filter water surface 49. Any sludge addition via conduit 63 causes a rise in water surface 33 stimulating flow 14 from the clarifier 31 through the outlet 42 into the expansion zone 72, thus returning a substantially solids free flow. It can be seen that flow 14 is returned upstream of bead bed 51, which is below bead bed 51 since FIG. 5A illustrates an upflow type of bioclarifier. A secondary return of clarified water occurs upon completion of the trigger discharge that has the effect of dropping bead filter water surface 49 below tank water surface 22 and mineralization basin water surface 33. The bead filter is rapidly refilled by an accelerated flow 10 and 14 until bead filter water surface 49 is re-established above the screen 50. As water surface 49 rises flow 14 is briefly reversed refilling the clarifier where a light load of solids then settles through clarifier 31 in the early stages of the next backwash sequence. This secondary exchange is of secondary consequence in this preferred configuration and is generally discouraged by reducing the sizing of conduit 75 so the flowrates 14 are of no consequence as the bead filter 2 is substantially refilled by the much larger flow 10. Alternately, a check valve can be added to line 75 preventing backflow. Water entering the expansion zone comingles with the water derived from the tank 1 and passes ultimately through the bead bed emerging substantially solids free above the screen 50. The vast quantity of water passing the bead returns to the fish tank to complete the recirculation loop and a small quantity leaves the filter through a continuous or intermittent flow 13 for utilization in the plant growout systems. It is understood that this embodiment represents a large class of configurations that are operated under low head while driving the sludge movement into the mineralization basin by means of a pneumatic sludge discharge chamber capable of interfacing with aerobic and anerobic mineralization of a partitioned or not partitioned mineralization basins.

Figure 5B:
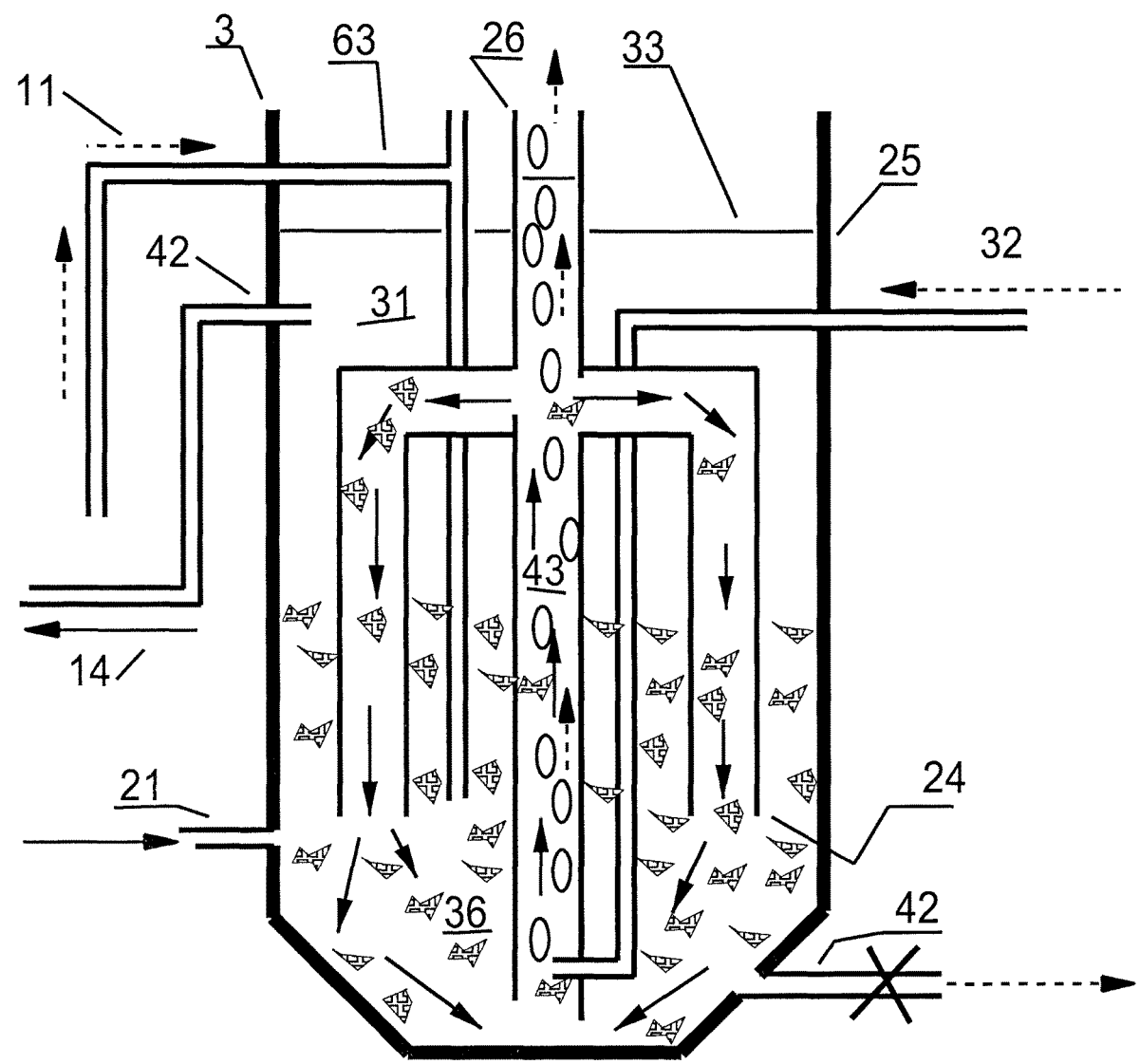
FIG. 5B illustrates another mineralization basin of the present invention.

FIG. 5B illustrates how an alternate the mineralization basin 3 can be aerated by a hypolimnetic aeration system 26 that lifts sludge laden water from the bottom of the mineralization basin by an airlift, and then returns it back near the bottom without significantly disturbing the clarification zone in the upper half of the basin. Generally, the mineralization basin 3 will have a steady-state operating water lever 33 established therein. Various water depths within the tank may be described in terms of the water level. For example, mineralization basin outlet 42 (or mineralization basin effluent outlet 42) is shown in FIG. 5B as within the "upper third of the water level," i.e., at some point between the water level surface and a depth of one-third of the water height in the tank or basin. Similarly, an influent inlet 21 (e.g., from a waste water source such as fish tank 1 in FIG. 5A) enters basin 3 within a lower third of the water level. A sludge input line 63 feeds into basin 3 and extends downward to have an outlet within the lower third of the water level. Aeration is accomplished within the airlift draft tube (or tubular body) 43 that terminates in a junction which allow the air to escape vertically as the sludge returns by gravity to the airlift discharge ports 24. FIG. 5B shows the airlift inlet being adjacent to the bottom of the tank (e.g., within the lower third of the water level). Likewise, the air supply line 32 feeds into draft tube 43 near it bottom (again within the lower third of the water level). A sludge discharge outlet 42 is also near the bottom of the basin. It can be seen how solids heavy fluid in the bottom portion of the basin travels in a path up the draft tube 43 into the upper half of the water level before taking a return path via return lines 24 which have outlets in the lower third of the water level. The point of separation illustrated here is in the form of a junction that should be designed to assure separation of the bubbles from the sludge flow.

Figure 5C:
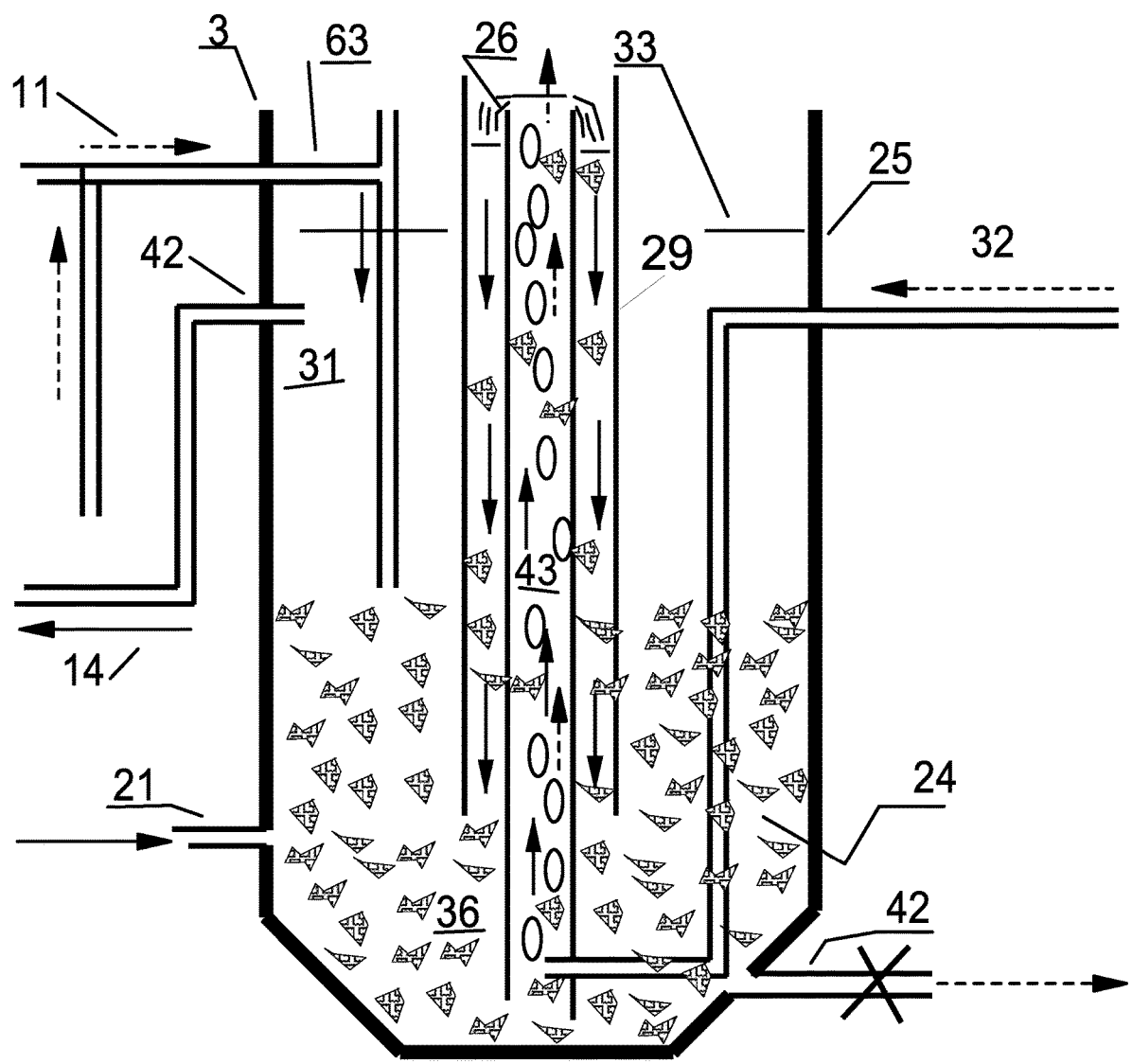
FIG. 5C illustrates a still further mineralization basin of the present invention.

It is understood that other physical configurations can be used to accomplish the same effect. For example, as seen in FIG. 5C, the draft tube 43 can be configured within a larger return flow tube 29 positioned concentrically around draft tube 43. Draft tube 43 and return flow tube 29 both extend above water level 33. The return path is formed by the annulus between the two concentric tubes. In this configuration advective and turbulent flow is confined largely to the bottom half of the mineralization basin. The top half remains quiescent effectively forming the clarification zone 31. The flow capacity of a clarifier is limited by its overflow rate (the flowrate divided by horizontal area) with values in the range of 600-1200 gpd/ft2 being typical for bioflocs. Whereas, a small clarifier or clarification zone as previously illustrated in FIG. 5A has a cross sectional area sufficient to largely clarify waters rising to exit 42 under the intermittent pulse from the bioclarifier pneumatic chambers, their cross-sectional area would largely limit the unit's ability to clarify a continuous flow via conduit 21. This modified aeration configuration illustrated in FIG. 5B allows the entire cross sectional area of the basin to be used for clarification and thus maximizes potential slip stream flow 21.

Figure 6:
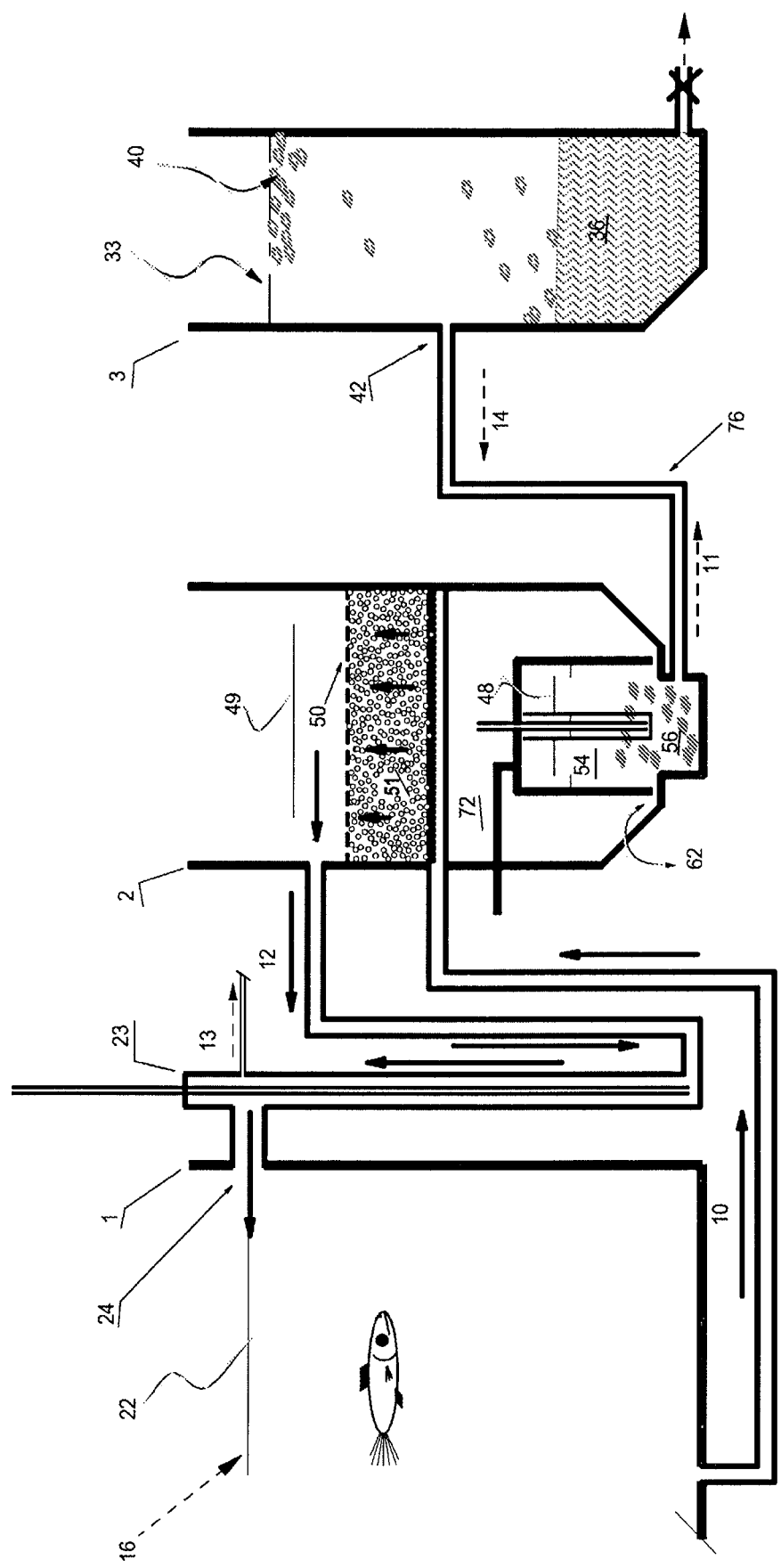
FIG. 6 illustrates an airlifted aquaponics nutrient generation system with an anaerobic mineralization basin.

Another preferred embodiment seen in FIG. 6 is also airlifted with the circulation loop between the floating bead filter 2 and the fish tank 1 established as previously described. The low pressure bead filter is not equipped with the elevated walls 60 and exchange between the bead filter and the mineralization basin is driven by hydraulic exchanges which occur with the fluctuations of water surface 49 as the unit is backwashed. The exchange occurs in a single pipe 76 that connects the sludge basin with the mineralization basin through port 42 positioned above the sludge digestion zone and below the water surface 33 a sufficient distance so that bulking sludges 40 are not routinely entrained when water leaves the basin via port 42. Here there is no aeration in the mineralization and the decaying sludges will quickly exhaust oxygen supplies in the digestion zone 36 creating conditions that favor the formation of ammonia as the stable nitrogen end-product. Ammonia can be a preferred nitrogen source for some plants. The lack of aeration allows the mineralization basin 3 to also function as a clarifier creating a zone of relatively clear water above the digesting sludge. In the beginning phases of a pneumatic backwash, the discharge of air from charge chamber 54 cause a dramatic and rapid drop in the filters water surface level 49 to a point well below water surface 33 and a brief but rapid flow 14 into the sludge basin via conduit 76 will result. The amount of flow is again controlled by the relative size of pipes delivering flow 10 and flow 14 to the bead filter hull. At the same time, the charge chamber is rapidly filling with dirty backflush waters while residual solids previously settled into sludge basin 56 are re-suspended. Water surface 49 rises surpassing the reduced mineralization water surface level 33 and flow 14 ceases, to be immediately replaced by flow 11 in the opposite direction. The suspended particles contained by the charge chamber 54 and the sludge compartment 56 are swept into the mineralization basin through port 42 where they are generally swept upwards with the rising surface level 33. The sludge digestion zone 36 remains relatively undisturbed. In the interim between backwashes (typically measured in hours) the suspended particles sink into the digestion zone, completing the separation process. The flow 13 here is diverted as a branch off of the airlift 23, although is it recognized that it could be diverted anywhere between above the screen 50 and the airlift discharge 24 where the hydraulic pressures are favorable. This configuration illustrates the robust nature of the invention. Here a single pipe accomplishes the exchange between the filter and mineralization basin. The solids separation processes within the charge chamber are imperfect, but, assure a strong movement of the solids into the mineralization basin. The mineralization basin itself is primitive with no particular need for partitioning or bulking reduction as long as the water overlying the digestion zone is reasonably free of solids. The advantageous reintroduction of the nutrient rich waters anywhere below the bead bed 51 assures that any water directed to the plant system(s) will be solids free.

Figure 7:
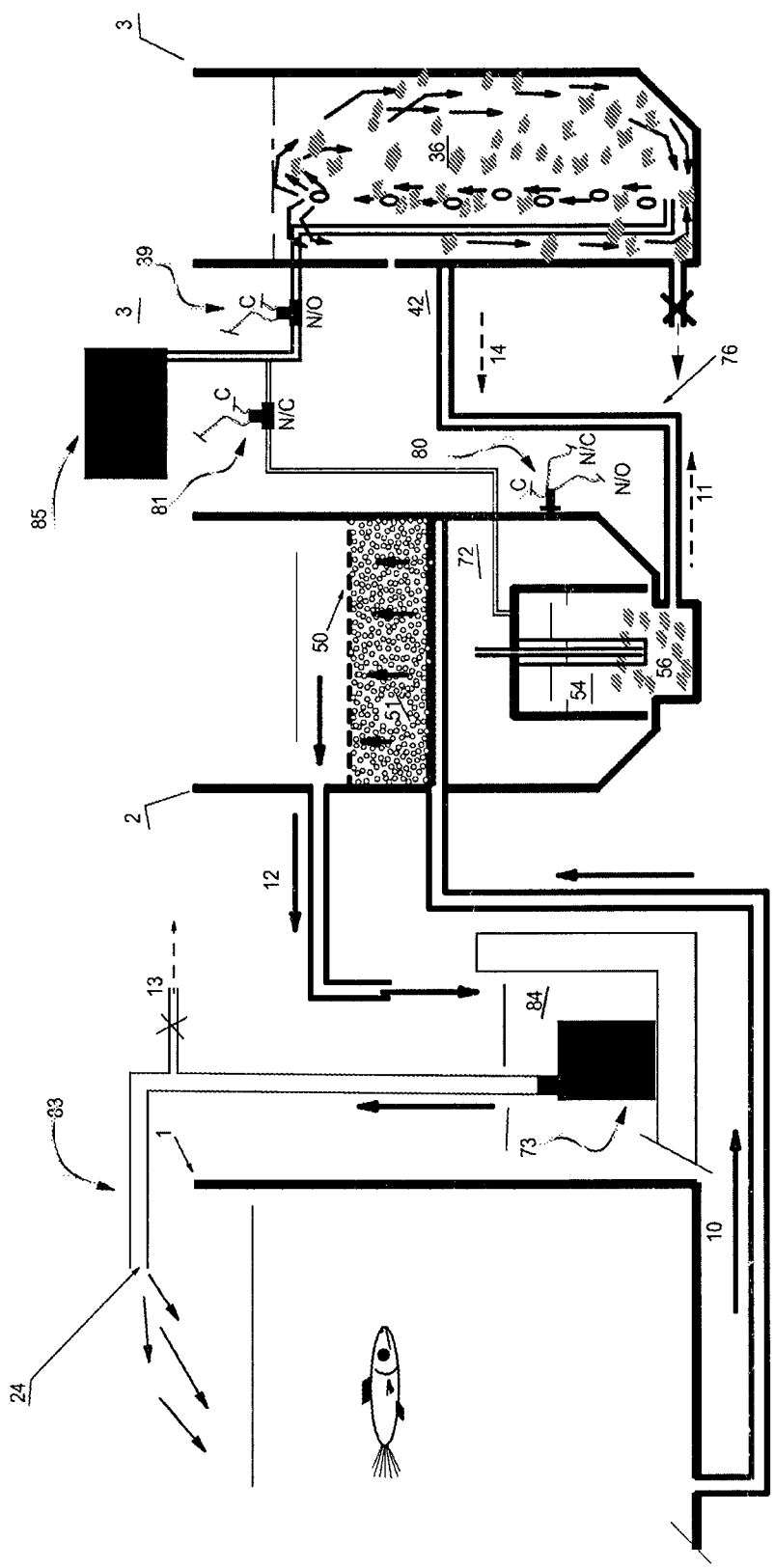
FIG. 7 illustrates a pump assisted aquaponics nutrient generation system.

A further embodiment seen in FIG. 7 illustrates how the introduction a simple pressure switch 80 can allow the utilization of a sequentially aerated mineralization basin 3 with an pneumatically washed floating bead filter 2 at relatively low cost. Here the recirculation loop is complicated with the addition of a sump 73 and a water pump, a reflection of the wide variety of recirculating system configurations that can be integrated into a nutrient production module. The bead filter 2 however, still operates under gravity from the water elevation 22 in the fish tank and discharging the recycling flow 12 into sump 84 where pump 73 lifts the water through conduit 83 for return to fish tank 1. A normally open (N/O) pressure switch is wired to normally provide no power to the N/O electronic valve 39 controlling air delivery to the aerobic sludge basin 3 and provides no power to the normally closed (N/C) electronic valve 81 controlling air to the charge chamber 54 during normal filtration. As in the other embodiments, filtration of the recirculation flow leads to the gradual filling of pore space in the granular bead bed 51 which tends to increase the pressure in the drop zone 72. The pressure increases causes the normally open pressure switch to close the circuit which immediately closes off the air supply to the mineralization basin 3 (electronic valve 39 closes) and opens electronic valve 81 allowing the delivery of air to the charge chamber to begin. During the next several minutes while the air chamber fills, the mineralization basin's sludge digestion zone 36 lies quiescent clarifying the upper reaches of the basin. Timing of the charge event is controlled by sizing of piping and air supply capacities. By the time the backwash is triggered by the accumulation of air the charge chamber, the waters in the vicinity of port 42 are substantially clarified so that exchange flow 14 is largely solids free as nutrient rich waters are transported back to the sludge basin 56, a necessary condition to assure a net movement of solids into the basin as the return flow 11 re-establishes pressure equilibrium as the wash is completed. Meanwhile the pressure drop in zone 72 (the result of the backwash event) resets the pressure switch to the normally open status, closing the backwash air supply off via valve 81 and resupplying air to the sludge basin 3 via valve 39. Use of the pressure switches can also be used to enhance the previously described embodiments and the many variants comprised of different combinations of the technologies previously described. The use of the pressure switch inherently optimizes the operation of the bead filter by prompting the cleaning of the bead bed at the precise pressure drop (across the bed) that produces the optimum bioclarification component. Further, increasing the rate of air discharge which results from this strategy of operation, can lead to better performance of pneumatic sludge basins. However, the approach does add additional points of failure to nutrient production module and is limited in optimization.

Figure 8:
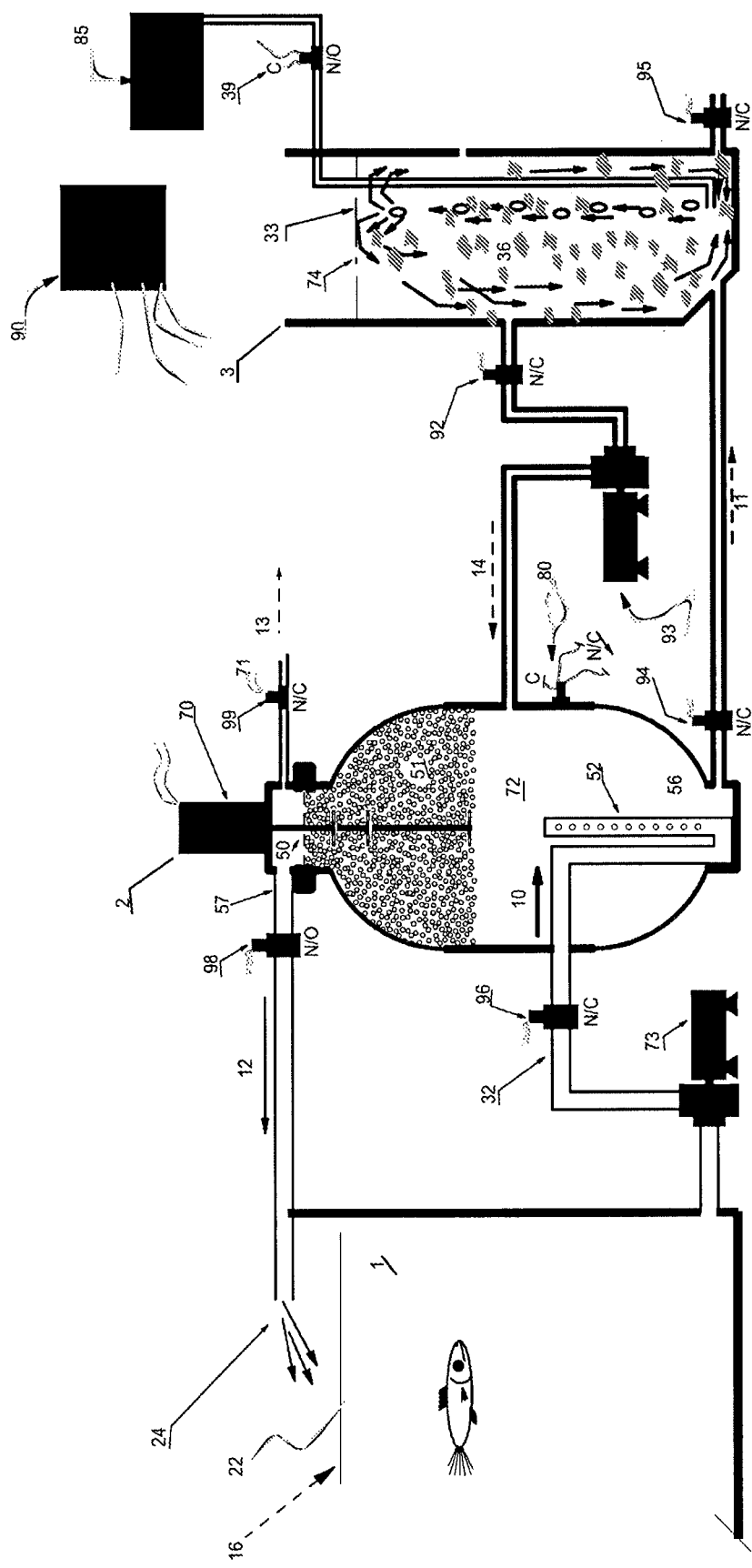
FIG. 8 illustrates another automated bioclarifier and mineralization basin system.

In the FIG. 8 embodiment, short comings recognized in the simple implementation of a pressure switch can be dramatically overcome by implementation of a sophisticated process control approach to developing a nutrient production module. Here a centrifugal pump 73 drives the main recirculation loop between the bead filter 2 and the fish tank 1. The fish tank itself serves as a sump for the pump 73 intake water supply that forms the flow 10. In other embodiments many tanks may discharge to a sump that serves as a pick up for the pump 73. The hull operates under a head pressure, typically in the 5-20 psi range, with the water passing through the bead bed 51 before returning flow 12 to the tank. Typically, the returning flow 12 is aerated by spraying the water back into the tank through a nozzle 24, although in other embodiments, an elevated packed column is used to enhance the aeration. Here the return is controlled by a normally open electronic valve 98. The bead filter here is connected to the mineralization basin 3 by a lower pipe delivering flow 11 and an upper pipe delivering the nutrient rich lower solids return flow 14. The basin illustrated here is a sequentially aerated basin, although other basin types could be employed. The bead filter is also equipped with a secondary port above the screen capable of delivering water 13 to the hydroponic plant systems. All the inlets and outlet lines associated with the floating bead filter are equipped with electronic valves that are ultimately controlled by a control box 90 that is programed to implement the critical backwashing and exchange processes required for the operation of the recirculation and the nutrient generation exchange. The electronic valves 98 and 96 associated with the continuous recirculating operations and the sludge digestion aeration 82 are typically normally open (N/O) valves, whereas, the valves associated with the exchange (92 and 94) and hydroponic dosing 99 are normally closed (N/C).

Process controls allow the system's operation to be optimized. For example, nutrients can be delivered to the hydroponic systems whenever the hull is pressurized, triggered by signals generated by a probe, hydroponic water level switches, manual intervention, or a timer in the hydroponic system. The flow 13 can be manifolded to support several hydroponic systems, perhaps with perhaps multiple unique dosing triggers. As described earlier, the backwashing sequence for the propeller-washed filter calls for a period of settling (5-10 minutes) prior to the discharge of sludges. In this embodiment, the sludge is discharged by reactivation of pump 73 and the opening of solenoid 94 controlling the discharge 11 to the basin 3. This timing assuring that this early leg of the exchange is solids rich. Under this embodiment, sludge digestion basin 3 is sized to receive this sludge flow and store it without discharge. Once the flow 11 is delivered the control algorithms housed in the control box 90 close the sludge valve 94 to free the bead filter 2 for resumption of normal filtration. Meanwhile the air valve 39 is closed (for 5-20 minutes) cutting off the air supply from air pump 85 assuring separation of solids out of the upper reaches of mineralization basin 3 in preparation of a control sequence that will facilitate the return of the nutrient rich, but, clarified flow 14 back to the bead filter drop zone 72. Pump 93 would normally be specified to be a low flow high-pressure pump, whereas, 73 is normally sized as a low-pressure high flow pump, so anytime 93 is activated it can overcome the hull pressure generated in zone 72. The normally closed control valve 99 can be activated whenever dosing of the hydroponic system is required, provided the filter is in the filtration mode. Here, there is no implied linkage between backwash frequency and hydroponic dosing. It would be anticipated that a nutrient generation module this complex would be serving a larger facility with multiple hydroponic systems thus the addition of multiple normally closed control valves downstream would be controlled by control box 90 or similar devices on the hydroponic systems. It is understood that his embodiment represents a wide class of system configurations under process control designed to accomplish the transfers of solids to the digestion basin and the critical exchanges between bead filter and the digestion basin.

The term "about" as used herein will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments+/−15%, or possibly as much as +/−20%. Similarly, the term "substantially" will typically mean at least 85% to 99% of the characteristic modified by the term. For example, "substantially all" will mean at least 85%, at least 90%, or at least 95%, etc.

The invention claimed is:

1. An aquaponic system comprising:
   a. a fish tank containing an aquatic species;
   b. a floating media bioclarifier including (i) an influent inlet configured to direct influent through a media bed, (ii) a sludge concentration space beneath the media bed, and (iii) an effluent outlet positioned to receive fluid treated and filtered by the media bed;
   c. wherein the bioclarifier influent inlet receives influent from the fish tank and the effluent outlet directs effluent to a return loop ultimately terminating into the fish tank;
   d. a mineralization tank receiving sludge having a first solids concentration from the bioclarifier and returning to the bioclarifier a fluid having a second solids concentration less than the first solids concentration; and
   e. a hydroponic system configured to selectively receive effluent from the bioclarifier.

2. The aquaponic system of claim 1, wherein the hydroponic system is incapable of directing fluid to the fish tank.

3. The aquaponic system of claim 1, wherein the first solids concentration is over 0.5 percent and the second solids concentration is less than 0.5 percent.

4. The aquaponic system of claim 3, wherein the first solids concentration is between about 1 percent and about 4 percent.

5. The aquaponic system of claim 1, wherein the fluid having a second solids concentration is returned to the bioclarifier upstream of the media bed.

6. The aquaponic system of claim 1, wherein no pump is present (1) in a line conveying sludge having the first solids concentration, or (2) in a line conveying the fluid having the second solids concentration.

7. The aquaponic system of claim 1, wherein a flow of sludge received by the mineralization tank is less than 0.01 percent of a flow of bioclarifier effluent back to the fish tank.

8. The aquaponic system of claim 1, further comprising a second influent inlet configured to receive influent from the fish tank which has bypassed the bioclarifier.

9. The aquaponic system of claim 8, wherein a flow rate into the second influent inlet of the mineralization tank is between about 1% and about 5% of a flow rate out of the effluent outlet of the bioclarifier.

10. The aquaponic system of claim 1, wherein a sludge input line enters the mineralization tank from a point above the water level.

11. An aquaculture system comprising:
   a. a fish tank containing an aquatic species;
   b. a floating media bioclarifier including (i) an influent inlet configured to direct influent through a media bed, (ii) a sludge concentration space beneath the media bed, and (iii) an effluent outlet downstream of the media bed;
   c. wherein the bioclarifier influent inlet receives influent from the fish tank and the effluent outlet directs effluent back to the fish tank;
   d. a mineralization tank including (i) a first influent inlet for receiving sludge having a first solids concentration from the bioclarifier, (ii) an effluent outlet for returning to the bioclarifier a fluid having a second solids concentration less than the first solids concentration, and (iii) a second influent inlet configured to receive influent from the fish tank which has bypassed the bioclarifier; and
   e. a hydroponic system configured to receive effluent from the bioclarifier.

12. An aquaculture system comprising:
   a. a growth tank containing an aquatic species;
   b. a floating media bioclarifier including (i) an influent inlet configured to direct influent through a media bed, (ii) a sludge concentration space beneath the media bed, and (iii) an effluent outlet downstream of the media bed;
   c. wherein the bioclarifier influent inlet receives influent from the growth tank and the effluent outlet directs effluent back to the growth tank; and
   d. a mineralization tank including (i) a first inlet receiving from the bioclarifier sludge having a first solids concentration, (ii) an outlet returning to the bioclarifier a fluid having a second solids concentration less than the first solids concentration, and (iii) a second inlet receiving an inflow from the growth tank, wherein the inflow has bypassed the bioclarifier.

13. An aquaculture system comprising:
   a. a growth tank containing an aquatic species;
   b. a floating media bioclarifier including (i) an influent inlet configured to direct influent through a media bed, (ii) a sludge concentration space beneath the media bed, and (iii) an effluent outlet downstream of the media bed;
   c. wherein the bioclarifier influent inlet receives influent from the growth tank and the effluent outlet directs effluent back to the growth tank; and
   d. a mineralization tank including (i) a first inlet receiving from the bioclarifier sludge having a first solids concentration, and (ii) an outlet returning to the bioclarifier a fluid having a second solids concentration less than the first solids concentration.

14. The aquaculture system of claim 13, wherein the mineralization tank includes a second inlet receiving an inflow from the growth tank, wherein the inflow has bypassed the bioclarifier.

15. The aquaculture system of claim 14, wherein a flow rate into the second influent inlet of the mineralization tank is less than 10% of a flow rate out of the effluent outlet of the bioclarifier.

16. The aquaculture system of claim 15, wherein the flow rate into the second influent inlet of the mineralization tank is between about 1% and about 5% of the flow rate out of the effluent outlet of the bioclarifier.

17. The aquaculture system of claim 13, wherein the mineralization tank further comprises an operating water level and an airlift aerator, the airlift aerator including (i) a tubular body; (ii) an airlift inlet within a lower quarter of the operating water level; and (iii) at least one return path extending from above or within an upper half of the operating water level downward to the lower half of the operating water level.

18. The aquaculture system of claim 17, wherein the return path is formed by at least one return line connected to the tubular body in an upper quarter of the operating water level and extending downward to have an outlet positioned within the lower third of the operating water level.

19. The aquaculture system of claim 17, wherein the return path is formed by an outer return flow tube formed concentrically around the airlift tubular body.

20. The aquaculture system of claim 17, further comprising a sludge input line extending into the mineralization tank, the sludge input line having an outlet in the lower quarter of the operating water level.

21. The aquaculture system of claim 20, wherein the sludge input line enters the mineralization tank from a point above the water level.

22. The aquaculture system of claim 13, wherein the mineralization tank includes a gas injection system configured to inject gas into sludge in the mineralization tank during an aerating time period and not inject gas into the sludge during a non-aerating time period, wherein the aerating time period is sufficient to prevent stratification of the sludge.

23. The aquaculture system of claim 22, wherein the non-aerating time period is at least five times longer than the aerating time period.

24. The aquaculture system of claim 13, wherein the mineralization tank includes a gas injection system configured (i) to inject gas into the mineralization tank during a first time period to create aerobic digestion conditions and (ii) to not inject gas into the mineralization tank during a second time period to create anaerobic digestion conditions.

25. The aquaculture system of claim 24, wherein the mineralization tank is operated under aerobic digestion conditions for longer periods of time than operated under anaerobic digestion conditions.

26. The aquaculture system of claim 24, wherein the mineralization tank is operated under aerobic digestion conditions for at least one hour and operated under anaerobic digestion conditions for at least one hour.

27. The aquaculture system of claim 13, wherein at least 25% of biodegradable solids of the sludge in the mineralization tank is converted to inorganic components during a residence time.

28. The aquaculture system of claim 13, wherein sludge in the mineralization tank predominantly undergoes aerobic digestion.

29. The aquaculture system of claim 13, wherein sludge entering the mineralization tank has an average residence time of at least 5 days.

30. The aquaculture system of claim 13, wherein sludge in the mineralization tank predominantly undergoes anaerobic digestion.

31. The aquaculture system of claim 13, wherein the first inlet and the outlet of the mineralization tank communicate with the bioclarifier through a common conduit.

\* \* \* \* \*